(12) United States Patent
Tsukagoshi

(10) Patent No.: US 9,019,343 B2
(45) Date of Patent: Apr. 28, 2015

(54) IMAGE DATA TRANSMISSION DEVICE, IMAGE DATA TRANSMISSION METHOD, AND IMAGE DATA RECEPTION DEVICE

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 729 days.

(21) Appl. No.: 13/322,723

(22) PCT Filed: Mar. 30, 2011

(86) PCT No.: PCT/JP2011/058151
§ 371 (c)(1),
(2), (4) Date: Nov. 28, 2011

(87) PCT Pub. No.: WO2011/125805
PCT Pub. Date: Oct. 13, 2011

(65) Prior Publication Data
US 2012/0075421 A1    Mar. 29, 2012

(30) Foreign Application Priority Data

Apr. 6, 2010  (JP) ................................. 2010-088048
Sep. 13, 2010 (JP) ................................. 2010-204960

(51) Int. Cl.
*H04N 13/00* (2006.01)
*H04N 21/2365* (2011.01)
(Continued)

(52) U.S. Cl.
CPC ....... *H04N 21/2365* (2013.01); *H04N 13/0059* (2013.01); *H04N 13/0066* (2013.01); *H04N 21/2362* (2013.01); *H04N 19/597* (2013.01); *H04N 19/70* (2013.01)

(58) Field of Classification Search
CPC ................... H04N 13/0055; H04N 19/00769; H04N 13/0239; H04N 13/0059; H04N 13/0048
USPC .......................................................... 348/43
See application file for complete search history.

(56) References Cited

U.S. PATENT DOCUMENTS 6,064,676 A * 5/2000 Slattery et al. ................ 370/412
6,111,896 A * 8/2000 Slattery et al. ................ 370/535
(Continued)

FOREIGN PATENT DOCUMENTS

JP    2002-218502 A    8/2002
JP    2002218502 A *   8/2002  ............. H04N 13/00
(Continued)

OTHER PUBLICATIONS

"Draft Errata List with Revision-Marked Corrections for H.264/AVC", JVT-1050, Thomas Wiegand et al., Joint Video Team (JVT) of ISO/IEC MPEG & ITU-T VCEG, 2003.
(Continued)

*Primary Examiner* — Sath V Perungavoor
*Assistant Examiner* — Howard D Brown, Jr.
(74) *Attorney, Agent, or Firm* — Lerner, David, Littenberg, Krumholz & Mentlik, LLP

(57) ABSTRACT

[Object] To enable a receiver compatible with MVC to adequately handle dynamic change in the contents of distribution and to perform correct stream reception.
[Solution] A broadcasting station 100 transmits a first transport stream TS1 and a second transport stream TS2 in a time-sharing manner. The TS1 includes the video elementary streams of a base view and a predetermined number of non-base views. The TS2 includes a video elementary stream of two-dimensional (2D) image data. Stream association information for associating the base view and a predetermined number of non-base views is inserted into the TS1. A receiver 200 recognizes that the TS1 has been transmitted, based on the stream association information, and also recognizes association between the base view and non-base views. The receiver 200 can adequately handle dynamic change of the TS1 and TS2, i.e., dynamic change in the contents of distribution, and perform correct stream reception.

23 Claims, 35 Drawing Sheets

(51) Int. Cl.

*H04N 21/2362* (2011.01)
*H04N 19/597* (2014.01)
*H04N 19/70* (2014.01)
*H04N 7/08* (2006.01)

(56) References Cited

U.S. PATENT DOCUMENTS

| | | | |
|---|---|---|---|
| 6,148,082 A * | 11/2000 | Slattery et al. | 380/212 |
| 2013/0279380 A1* | 10/2013 | Hong et al. | 370/310 |
| 2013/0311669 A1* | 11/2013 | Reimers et al. | 709/231 |
| 2014/0037029 A1* | 2/2014 | Murakami et al. | 375/340 |
| 2014/0044218 A1* | 2/2014 | Murakami et al. | 375/299 |
| 2014/0071232 A1* | 3/2014 | Tsukagoshi et al. | 348/43 |
| 2014/0185515 A1* | 7/2014 | Hong et al. | 370/312 |

FOREIGN PATENT DOCUMENTS

| | | | | | |
|---|---|---|---|---|---|
| JP | 2002218502 A | * | 8/2002 | | H04N 13/00 |
| JP | 2005-006114 A | | 1/2005 | | |
| JP | 2005006114 A | * | 1/2005 | | H04N 13/00 |
| JP | 2005006114 A | * | 1/2005 | | H04N 13/00 |
| JP | 2009-147571 A | | 7/2009 | | |
| JP | 2009147571 A | * | 7/2009 | | H04N 7/173 |
| JP | 2009147571 A | * | 7/2009 | | H04N 7/173 |

OTHER PUBLICATIONS

Joint Draft 4.0 on Multiview Video Coding, Joint Video Team of ISO/IEC MPEG & ITU-T VCEG, JVT-X209, Jul. 2007.

Heiko Schwarz, Detlev Marpe, and Thomas Wiegand, "Overview of the Scalable Video Coding Extension of the H.264/AVC Standard", IEEE Transactions on Circuits and Systems for Video Technology, vol. 17, No. 9, Sep. 2007, pp. 1103-1120.

* cited by examiner

FIG. 6

Stream_association_tag - An 8-bit field that identifies the type of data.
Stream_association_data_length - An 8-bit count of the number of bytes following the data_length.
stream_count_for_association – 4bit field in the range 0 to 15 that indicates the number of streams associated with the basis stream
'0' means that there is no associated streams.
Elementary_PID_of_minimum_view_id - A 13-bit unsigned field indicates PID of elementary stream that indicates the basis stream.
Associated_stream_Elementary_PID - A 13-bit unsigned field indicates PID of elementary stream that indicates the associated stream to the basis stream.
Component_tag_minimum_view_id
An 8-bit unsigned field indicates a component_tag of elementary stream that indicates the basis stream.
Component_tag_Associated_stream
An 8-bit unsigned field indicates a component_tag of elementary stream that indicates the associated stream to the basis stream.

FIG. 7

| Syntax | No. of Bits | Format |
|---|---|---|
| Stream_association_data() { | | |
|   Stream_association_tag | 8 | uimslbf |
|   Stream_association_data_length | 8 | uimslbf |
|   reserved | 4 | '1111' |
|   stream_count_for_association | 4 | uimslbf |
|   Component_tag_minimum_view_id | 8 | uimslbf |
|   for( i = 0; i< stream_count_for_association; i++){ | | |
|     Component_tag_Associated_stream[i] | 8 | uimslbf |
|   } | | |
| } | | |

Stream_association Information: { stream_count_for_association through Component_tag_Associated_stream[i] }

FIG. 10 descriptor_tag -      An 8-bit field that identifies the type of descriptor.
descriptor_length -   An 8-bit count of the number of bytes following the descriptor_length.
stream_count_for_association – 4bit field in the range 0 to 15 that indicates the number of streams associated with the basis stream
                      '0' means that there is no associated streams.
Elementary_PID_of_minimum_view_id - A 13-bit unsigned field indicates PID of elementary stream that indicates the basis stream.
Associated_stream_Elementary_PID - A 13-bit unsigned field indicates PID of elementary stream that indicates the associated stream to the basis stream.
Component_tag_minimum_view_id
                      An 8-bit unsigned field indicates a component_tag of elementary stream that indicates the basis stream.
Component_tag_Associated_stream
                      An 8-bit unsigned field indicates a component_tag of elementary stream that indicates the associated stream to the basis stream.

FIG. 11

| Syntax | No. of Bits | Format |
|---|---|---|
| Stream_association descriptor() { | | |
|   descriptor_tag | 8 | uimsbf |
|   descriptor_length | 8 | uimsbf |
|   reserved | 4 | '1111' |
|   stream_count_for_association | 4 | uimsbf |
|   Component_tag_minimum_view_id | 8 | uimsbf |
|   for( i = 0; i< stream_count_for_association; i++){ | | |
|     Component_tag_Associated_stream[i] | 8 | uimsbf |
|   } | | |
| } | | |

Stream_association Information: stream_count_for_association through Component_tag_Associated_stream[i]

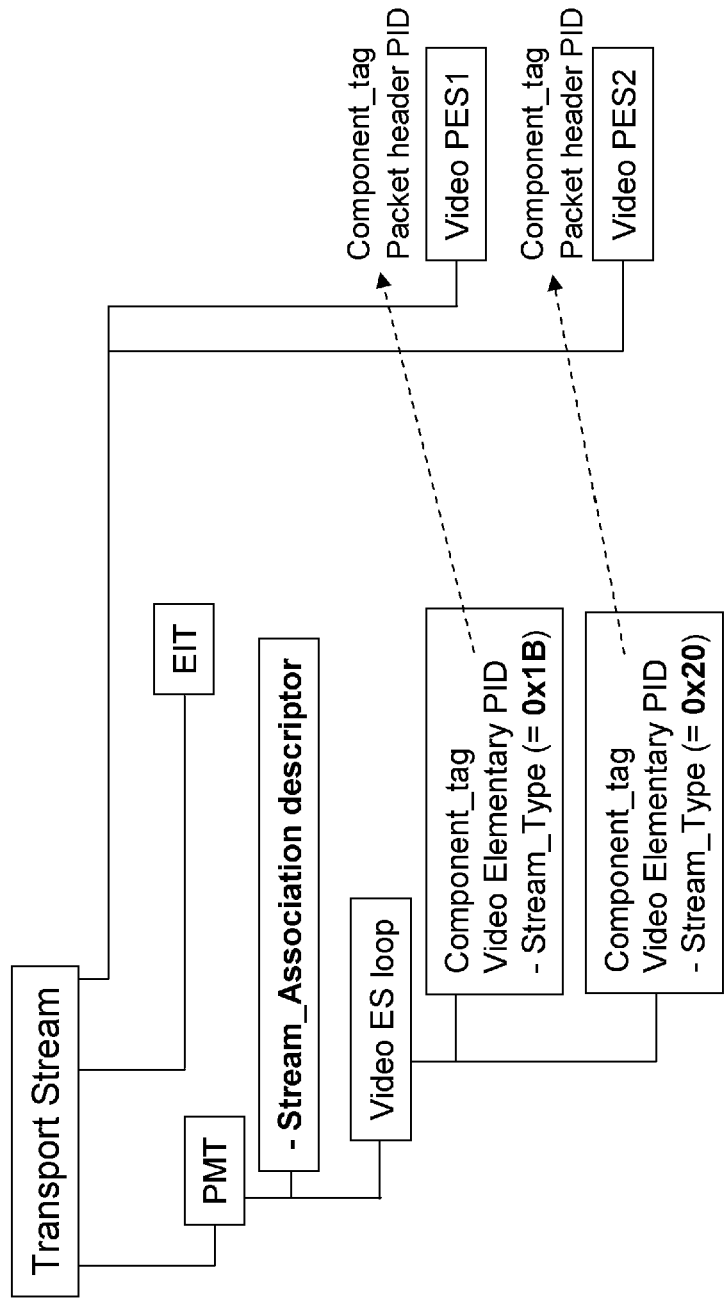

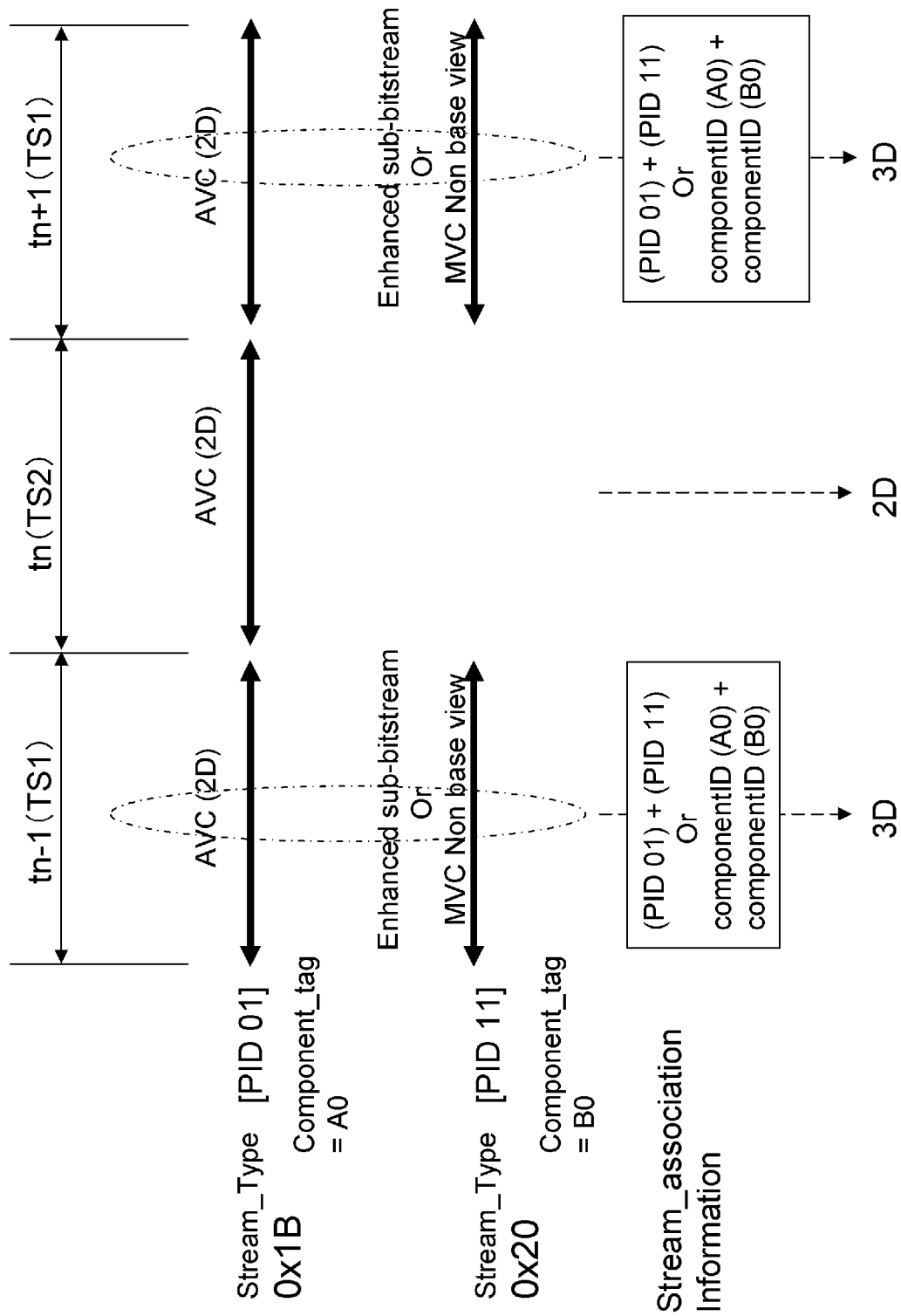

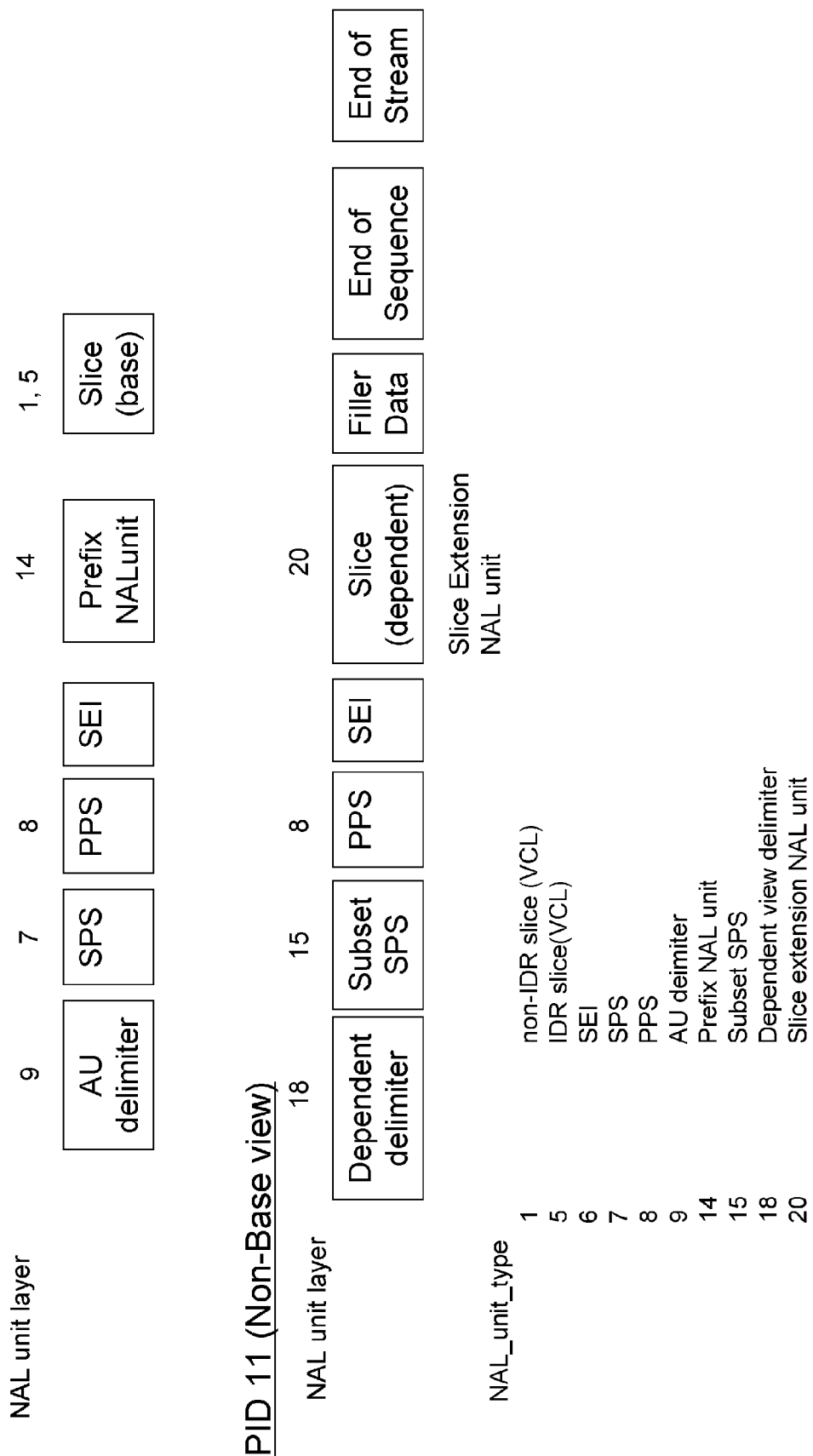

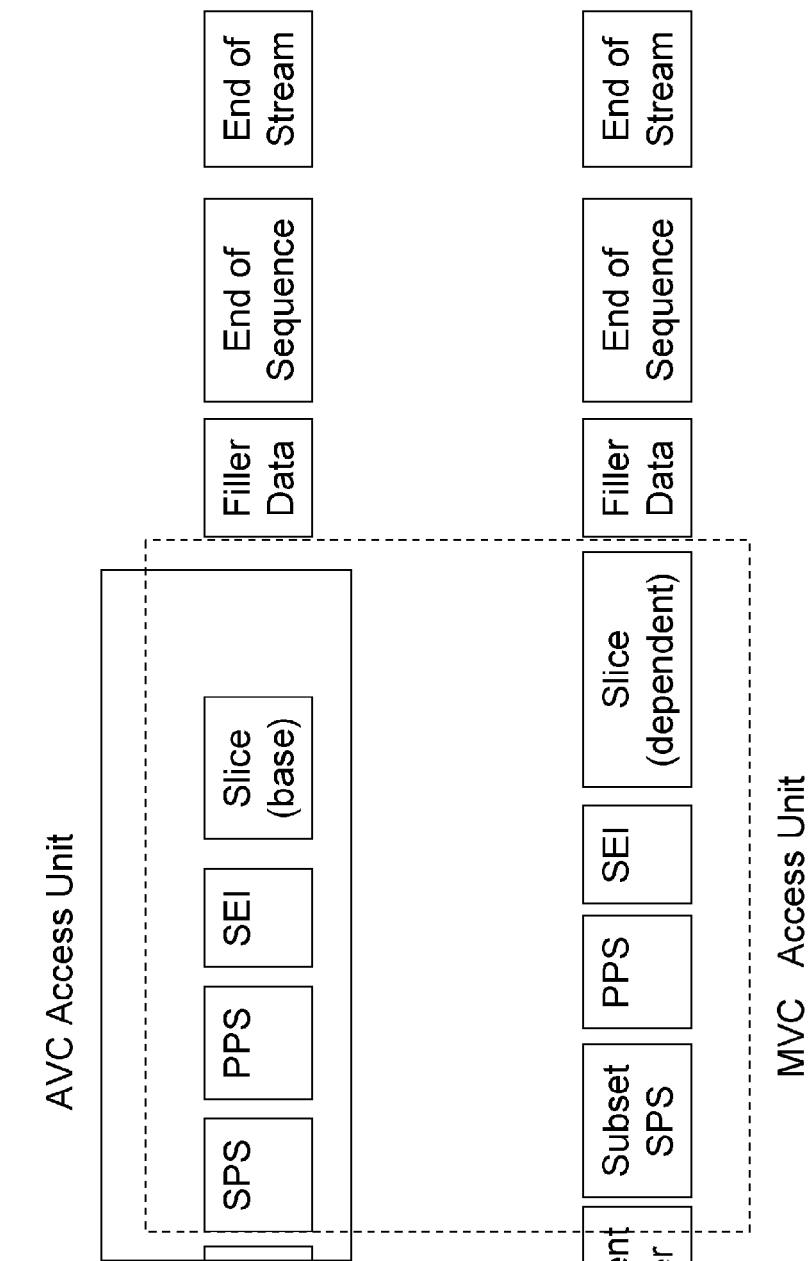

FIG. 22

| Syntax | No. of Bits | Format |
|---|---|---|
| Stream_association_data() { | | |
| Stream_association_tag | 8 | uimslbf |
| Stream_association_data_length | 8 | uimslbf |
| reserved | 1 | '1' |
| stream_association_number_minus1 | 3 | uimslbf |
| stream_count_for_association | 4 | uimslbf |
| stream_association_id | 3 | bslbf |
| Elementary_PID_of_minimum_view_id | 13 | uimslbf |
| for( i = 0; i< stream_count_for_association; i++){ | | |
| reserved | 3 | '111' |
| Associated_stream_Elementary_PID[i] | 13 | uimslbf |
| } | | |
| } | | |

FIG. 23

Stream_association_tag - An 8-bit field that identifies the type of data.
Stream_association_data_length - An 8-bit count of the number of bytes following the data_length.
stream_count_for_association – 4bit field in the range 0 to 15  that indicates the number of streams associated with the basis stream
 '0' means that there is no associated streams.
Elementary_PID_of_minimum_view_id - A 13-bit unsigned field indicates PID of elementary stream that indicates the basis stream.
Associated_stream_Elementary_PID - A 13-bit unsigned field indicates PID of elementary stream that indicates  the associated stream to the basis stream.
stream_association_number_minus1 - A 3-bit unsigned field [0..7] indicating total number of stream_association information divided to multiple Stream_association data.
 "0" means the stream_association data exists by its own.
 non-"0" values mean there are multiple stream_association data .
Component_tag_minimum_view_id
 An 8-bit unsigned field indicates a component_tag of elementary stream that indicates the basis stream.
Component_tag_Associated_stream
 An 8-bit unsigned field indicates a component_tag of elementary stream that indicates the associated stream to the basis stream.
stream_association_id - A 3-bit unsigned field indicates total number of stream_association information divided to multiple Stream_association data.
 If stream_association_number_minus1 has non-"0" value, the total stream_association information is described with the multiple stream_association data with which stream_association_id specifies the individual.

FIG. 24

| Syntax | No. of Bits | Format |
|---|---|---|
| Stream_association_data() { | | |
| Stream_association_tag | 8 | uimslbf |
| Stream_association_data_length | 8 | uimslbf |
| reserved | 6 | '111111' |
| stream_association_number_minus1 | 3 | uimslbf |
| stream_count_for_association | 4 | uimslbf |
| stream_association_id | 3 | bslbf |
| Component_tag_minimum_view_id | 8 | uimslbf |
| for( i = 0; i< stream_count_for_association; i++){ | | |
| Component_tag_Associated_stream[i] | 8 | uimslbf |
| } | | |
| } | | |

FIG. 32

| Syntax | No. of Bits | Format |
|---|---|---|
| Stream_association_data() { | | |
|   Stream_association_tag | 8 | uimslbf |
|   Stream_association_data_length | 8 | uimslbf |
|   stream_association_number | 4 | uimslbf |
|   stream_association_id | 4 | bslbf |
|   stream_count_for_association | 4 | bslbf |
|   reserved | 5 | '11111' |
|   indication_of_selected_stream_display | 1 | bslbf |
|   indication_of_resolution_master | 1 | bslbf |
|   Elementary_PID_of_minimum_view_id | 13 | bslbf |
|   for( i = 0; i< stream_count_for_association; i++){ | | |
|     reserved | 1 | '1' |
|     display_mandatory_flag | 1 | bslbf |
|     resolution_master_flag | 1 | bslbf |
|     Associated_stream_Elementary_PID[] | 13 | uimslbf |
|   } | | |
| } | | |

FIG. 33 descriptor_tag - An 8-bit field that identifies the type of descriptor.
descriptor_length - An 8-bit count of the number of bytes following the descriptor_length.
stream_association_number - A 4-bit unsigned field [0..15] indicating total number of stream_association information divided to multiple Stream_association descriptor.
"0" means the stream_association descriptor exists by its own.
non-"0" values mean there are multiple stream_association descriptors.

stream_association_id - A 4-bit unsigned field indicates total number of stream_association information divided to multiple Stream_association data.
If stream_association_number has non-"0" value,
the total stream_association information is described with
the multiple stream_association data with which stream_association_id specifies the individual.

stream_count_for_association – 4bit field in the range 0 to 15 that indicates the number of streams associated with the basis stream
'0' means that there is no associated streams.

indication_of_resolution_master
A 1bit flag if there exists the stream in the associated streams that has the resolution_master_flag being equal to '1'.
'1' specifies that there is the stream with resolution_master_flag is '1'.
'0' specifies that resolution_master is base-view stream.

indication_of_selected_stream_display
A 1bit flag to indicate the target to display mandatory.
'1' specifies that the selected non-baseview stream is display mandatory together with base-view stream.
'0' specifies that all non-baseview streams shall be displayed together with base-view stream.

FIG. 34

Elementary_PID_of_minimum_view_id - A 13-bit unsigned field indicates PID of elementary stream that indicates the basis stream.

Associated_stream_Elementary_PID - A 13-bit unsigned field indicates PID of elementary stream that indicates the associated stream to the basis stream.

Component_tag_minimum_view_id
An 8-bit unsigned field indicates the component_tag of elementary stream that indicates the basis stream.

Component_tag_Associated_stream
An 8-bit unsigned field indicates a component_tag of elementary stream that indicates the associated stream to the basis stream..

display_mandatory_flag
A 1 bit flag indicating that the corresponding stream must be displayed.
'1' specifies that the stream must be displayed.
'0' specifies that the display of the stream is not mandatory to display.

resolution_master_flag
A 1bit flag to indicate if the corresponding stream is the primary master in terms of resolution. '1' specifies that this is th master, '0' specifies that this stream is not the master.
Specifying that the picture resolution of corresponding coded stream is the target resolution.

FIG. 35

| Syntax | No. of Bits | Format |
|---|---|---|
| Stream_association_data() { | | |
|   Stream_association_tag | 8 | uimslbf |
|   Stream_association_data_length | 8 | uimslbf |
|   stream_association_number | 4 | uimslbf |
|   stream_count_for_association | 4 | bslbf |
|   reserved | 2 | '11' |
|   stream_association_id | 4 | bslbf |
|   indication_of_selected_stream_display | 1 | bslbf |
|   indication_of_resolution_master | 1 | bslbf |
|   Component_tag_minimum_view_id | 8 | bslbf |
|   for( i = 0; i< stream_count_for_association; i++){ | | |
|     reserved | 6 | '111111' |
|     display_mandatory_flag | 1 | bslbf |
|     resolution_master_flag | 1 | bslbf |
|     Component_tag_Associated_stream[] | 8 | uimslbf |
|   } | | |
| } | | |

IMAGE DATA TRANSMISSION DEVICE, IMAGE DATA TRANSMISSION METHOD, AND IMAGE DATA RECEPTION DEVICE

CROSS-REFERENCES TO RELATED APPLICATIONS

The present application is a national phase entry under 35 U.S.C. §371 of International Application No. PCT/JP2011/058151 filed Mar. 30, 2011, published on Oct. 13, 2011 as WO 2011/125805 A1, which claims priority from Japanese Patent Application No. JP 2010-088048 filed in the Japanese Patent Office on Apr. 6, 2010 and Japanese Patent Application No. JP 2010-204960 filed in the Japanese Patent Office on Sep. 13, 2010.

TECHNICAL FIELD

The present invention relates to an image data transmission device, an image data transmission method, and an image data reception device, and specifically relates to an image data transmission device or the like for transmitting stereoscopic image data, scalable encoded image data, and so forth.

BACKGROUND ART

Heretofore, H.264/AVC (Advanced Video Coding) has been known as a moving image encoding format (see NPL 1). Also, H.264/MVC (Multi-view Video Coding) has been known as an extending system of this H. 264/AVC (see NPL 2). With MVC, an arrangement has been employed wherein the image data of multi-view is collectively encoded. With MVC, multi-view image data is encoded as the image data of a single base view (base view) and the image data of one or more non-base views (non-base view).

Note that H.264/SVC (Scalable Video Coding) has also known as an extended format of this H.264/AVC (see NPL 3). SVC is a technique for encoding an image in a hierarchical manner. With SVC, the hierarchy is divided into a basic hierarchy (lowest hierarchical level) including image data necessary for decoding a moving image with the minimum quality, and an extended hierarchy (upper hierarchical level) including image data for enhancing the quality of a moving image by being added to this basic hierarchy.

CITATION LIST

Non Patent Literature

NPL 1: "Draft Errata List with Revision-Marked Corrections for H.264/AVC", JVT-I050, Thomas Wiegand et al., Joint Video Team (JVT) of ISO/IEC MPEG & ITU-T VCEG, 2003

NPL 2: Joint Draft 4.0 on Multiview Video Coding, Joint Video Team of ISO/IEC MPEG & ITU-T VCEG, JVT-X209, July 2007

NPL 3: Heiko Schwarz, Detlev Marpe, and Thomas Wiegand, "Overview of the Scalable Video Coding Extension of the H.264/AVC Standard", IEEE TRANSACTIONS ON CIRCUITS AND SYSTEMS FOR VIDEO TECHNOLOGY, VOL. 17, No. 9, SEPTEMBER 2007, pp. 1103-1120.

SUMMARY OF INVENTION

Technical Problem

With a distribution environment where an AVC stream and an MVC stream are dynamically switched, a receiver compatible with MVC is expected to determine whether the streams are made up of a stream with "Stream_Type=0x1B" alone, or include both streams of "Stream_Type=0x1B" and "Stream_Type=0x20" to perform switching of a reception mode.

Common AVC (2D) video elementary streams are transmitted with "Stream_Type=0x1B" of a PMT (Program Map Table). Also, the video elementary stream (Base view sub-bitstream) of the MVC base view (Base view) may be transmitted with "Stream_Type=0x1B" of the PMT. In the case of MVC, the image data of the base view, and the image data of a non-base view (Non base view) may collectively be transmitted. That is to say, in the event that the image data of the base view, and the image data of a non-base view are separately transmitted, the video elementary stream (Base view sub-bitstream) of the base view of MVC may be transmitted with "Stream_Type=0x1B" of the PMT.

An arrangement has been provided to a section (Section) portion within a transport stream (Transport Stream) whereby determination can be made whether the stream is an AVC stream or MVC stream, with the level of the PMT serving as PSI (Program Specific Information). Specifically, when the video elementary streams are made up of "Stream_Type=0x1B" alone, it can be found that the stream is a 2D AVC stream. Also, in the event that the video elementary stream include both of "Stream_Type=0x1B" and "Stream_Type=0x20", it can be found that the stream is an MVC stream.

However, the PMT may not necessarily dynamically be updated by a facility on the transmission side. In this case, at the time of the contents of distribution being switched from a stereoscopic (3D) image to a two-dimensional (2D) image, the following inconvenience can be conceived. Specifically, it can be conceived that the receiver assumes to continuously receive a stream of which the stream type (Stream_Type) is "0x20" along with an elementary stream of which the stream type (Stream_Type) is "0x1B", and continuously awaits data thereof.

After the contents of distribution are switched to a two-dimensional (2D) image, the elementary stream of "0x20" is not received, but the receiver internally continuously awaits an elementary stream of "0x20". As a result thereof, correct decoding may not be performed, and consequently, abnormal display may be performed. In this way, in the event that the receiver determines its own mode in expectation of only the type of [stream_type] of the PMT, the mode thereof may be incorrect, and correct stream reception may not be performed.

Also, with an existing signal standard (MPEG), it is essential to insert the descriptor of "MVC_extension descriptor" into the video elementary stream of the base view of MVC of "Stream_Type=0x1B" (Base view sub-bitstream) as a descriptor of the PMT. In the event that this descriptor exists, it can be found that there is the video elementary stream (Non-Base view sub-bitstream) of a non-base view.

However, the video elementary stream of "Elementary PID" that "Stream_Type=0x1B" indicates is not restricted to the video elementary stream of the base view (Base view) of the above-mentioned MVC (Baseview sub-bitstream). The stream of the conventional AVC stream (in this case, mostly High Profile) may also be conceived. In particular, in order to assure compatibility with an existing 2D receiver, the video elementary stream of the base view that is stereoscopic (3D) image data may be recommended as the video elementary stream of the conventional AVC (2D) without change.

In this case, the streams of the stereoscopic image data are made up of an AVC (2D) video elementary stream, and the video elementary stream of a non-base view (Non-Base view sub-bitstream). In this case, the descriptor of "MVC_extension descriptor" is not associated with the video elementary stream of "Stream_Type=0x1B". Accordingly, it is not found whether or not there is the video elementary stream of a non-base view (Non-Base view sub-bitstream), other than the AVC (2D) video elementary stream equivalent to the video elementary stream of the base view.

Also as described above, with a distribution environment where an AVC (2D) stream and an MVC stream are dynamically switched, the receiver compatible with MVC is expected to determine whether the streams are made up only "Stream_Type=0x1B" or made up of both of "Stream_Type=0x1B" and "Stream_Type=0x20" to perform switching of the reception mode. The common AVC (2D) video elementary streams are transmitted with "Stream_Type=0x1B" of the PMT (Program Map Table). Also, the video elementary stream of the base view (Base view) of MVC (Base view sub-bitstream) may be transmitted with "Stream_Type=0x1B" of the PMT.

At this time, multiple video elementary streams may be multiplexed within one transport stream (TS: Transport Stream). Some of the video elementary streams thereof may make up the stream of stereoscopic image data. For example, let us consider a case where the following video streams are multiplexed in one transport stream.

PID0 (AVC 2D) stream_type=0x1B
PID1 (AVC 3D Frame Compatible) stream_type=0x1B
PID2 (MVC non-base substream) stream_type=0x20

With the video elementary stream of "PID0", this itself is just the stream of conventional two-dimensional (2D) image data. This video elementary stream makes up the stream of stereoscopic (3D) image data along with the video elementary stream of a non-base view (Non-Base view sub-bitstream) of "PID2". However, video streams serving as 3D components cannot simply be associated with "stream_type" alone. That is to say, this is because "Stream_Type=0x1B" can also be applied to the video elementary stream of "PID1". Note that "AVC 3D Frame Compatible" indicates stereoscopic (3D) image data such as a side-by-side method, top-and-bottom method, or the like.

Note that description has been made so far regarding an example wherein the encoding format of the image data of the base view, and the encoding format of the image data of a non-base view are MPEG4-AVC. However, a case can also be conceived wherein the encoding format of the image data of the base view, and the encoding format of the image data of a non-base view are another encoding format such as the MPEG2 video format or the like, and further a case can also be conceived wherein the encoding format of the image data of the base view, and the encoding format of the image data of a non-base view are not the same but different.

Also, description has been made so far wherein it is difficult to determine whether or not an elementary stream included in a transport stream makes up stereoscopic (3D) image data, and further it is difficult to determine which elementary stream of elementary streams included in a transport stream makes up stereoscopic (3D) image data, and so forth. Though detailed description will be omitted, these disadvantages also occur in the event of transmitting an AVC stream and the above-mentioned SVC stream in a time-sharing manner.

An object of this invention is to enable a receiver compatible with MVC, SVC, or the like to adequately handle dynamic change in the contents of distribution, and to perform correct stream reception.

Solution to Problem

A concept of this invention is an image data transmission device including: a data output unit configured to output first image data, a predetermined number of second image data and/or meta data relating to this first image data; and a data transmission unit configured to transmit a transport stream; with the transport stream including the packets obtained by packetizing a first elementary stream including first image data output from the data output unit, and a predetermined number of second elementary streams including a predetermined number of second image data and/or meta data output from the data output unit respectively; and with the data transmission unit inserting stream association information for associating the first elementary stream with the predetermined number of second elementary streams into the transport stream.

With the present invention, the first image data, and the predetermined number of second image data and/or meta data relating to this first image data are output by the data output unit. For example, the first image data is the image data of the base view making up stereoscopic (3D) image data, and the second image data is the image data of a view (non-base view) other than the base view making up the stereoscopic image (3D) data. In this case, for example, the first image data is the image data of one of the left eye and the right eye for obtaining a stereo stereoscopic image, and the second image data is the image data of the other of the left eye and the right eye for obtaining a stereo stereoscopic image.

Also, the meta data is disparity information (disparity vector, depth data, etc.) corresponding to stereoscopic image data, for example. For example, the reception side can obtain the display image data of a predetermined number of views by subjecting received image data to interpolation processing (post-processing), using this disparity information. Also, for example, the first image data is the encoded image data of the lowest level making up scalable encoded imaged data, and the second image data is the encoded image data of a hierarchical level other than the lowest level making up scalable encoded image data.

A transport stream is transmitted by the data transmission unit. This transport stream includes the packets obtained by packetizing the first elementary stream including the first image data, and the predetermined number of second elementary streams including the predetermined number of the second image data and/or meta data respectively. In this case, there are a state in which only the predetermined number of the second image data are included, a state in which only the predetermined number of meta data are included, further a state in which the predetermined number of the second image data and meta data are included, and so forth.

For example, a combination of optional encoding format s is available as an encoding format of the first image data included in the first elementary stream, and an encoding format of the second image data included in the predetermined number of second elementary streams. For example, there can be conceived a case where the encoding format is MPEG4-AVC alone, a case where the encoding format is MPEG2 video alone, further a case of a combination of these encoding formats, further a case of a combination of other coding formats, and so forth.

Stream association information for associating the first elementary stream, and the predetermined number of second video elementary streams is inserted into the transport stream. For example, this stream association information is taken as information for associating the packet identifier of the first elementary stream, and the packet identifiers of the predetermined number of second elementary streams. Also, for example, this stream association information is taken as information for associating the component tag of the first elementary stream, and the component tags of the predetermined number of second elementary streams.

With the present invention, for example, the data transmission unit is configured to insert the stream association information a private data region of a packet (PES packet) obtained by packetizing a first elementary stream. In this case, change in the number of views of stereoscopic image data, or change in the number of hierarchical levels of scalable encoded image data can be managed in increments of PES.

Also, with the present invention, for example, an event information table serving as service information for performing management in increments of events is included in a transport stream, and the data transmission unit is configured to insert the stream association information under the event information table. In this case, change in the number of views of stereoscopic image data, or change in the number of hierarchical levels of scalable encoded image data can be managed in increments of events.

Also, with the present invention, for example, a transport stream includes a program map table serving as program specific information indicating which program each of the elementary streams included in this transport stream belongs to, and the data transmission unit is configured to insert the stream association information under the program map table.

In this case, for example, the data transmission unit is configured to insert the stream association information as the program descriptor of the program map table. Also, in this case, for example, the data transmission unit is configured to insert the stream association information under the video elementary loop of the program map table. In this case, change in the number of views of stereoscopic image data, or change in the number of hierarchical levels of scalable encoded image data can be managed in increments of programs (programs).

With the present invention, for example, an arrangement may be made wherein the stream association information further includes the control information of the output resolutions of the first image data and the second image data. Thus, the reception side can adjust the output resolutions of the first image data and the second image data to a predetermined resolution based on this control information.

Also, with the present invention, for example, an arrangement may be made wherein the stream association information further includes the control information specifying whether or not each of the predetermined number of second image data has to be displayed. Thus, the reception side can know which of the predetermined number of second image data has to be displayed based on this control information.

Also, with the present invention, for example, the image data transmission unit is configured to insert M (M is an integer of two or more) pieces of the stream association information into a transport stream, and the M pieces of the stream association information are arranged to associate a first video elementary stream, and a second video elementary stream within each of the sets obtained by dividing a predetermined number of second video elementary streams into M sets. In this way, the M pieces of the stream association information are used, whereby a great number of second video elementary streams can be associated with a first video elementary stream, for example, even in the event that the stream association information is inserted into a region having less capacity such as the private data region of a PES packet, or the like.

With the present invention, stream association information for associating the first elementary stream, and the predetermined number of second elementary streams is inserted into the transport stream. Accordingly, the reception side can facilitate determination whether or not this transport stream includes stereoscopic (3D) image data or scalable encoded image data, and so forth, based on this correlation information. Also, with this transport stream, the reception side can facilitate determination, for example, such as which elementary stream makes up stereoscopic (3D) image data or scalable encoded image data, and so forth. Accordingly, the reception side can adequately handle dynamic change in the contents of distribution, and perform correct stream reception.

Also, another concept of the present invention is an image data transmission device including: at least a data transmission unit configured to transmit a first transport stream and a second transport stream in a time-sharing manner; with the first transport stream including the packets obtained by packetizing a first elementary stream including first image data, and a predetermined number of second elementary streams including a predetermined number of second image data and/or meta data associated with the first image data respectively, and further includes stream association information for associating the first elementary stream with the predetermined number of second elementary streams; and with the second transport stream including a packet obtained by packetizing a third elementary stream including third image data.

With the present invention, at least the first transport stream and second transport stream are transmitted by the data transmission unit in a time-sharing manner. The first transport stream includes the packets obtained by packetizing the first elementary stream including the first image data, and the predetermined number of second elementary streams including the predetermined number of second image data and/or meta data respectively.

With the present invention, the stream association information for associating the first elementary stream and the predetermined number of second elementary streams is inserted into the first transport stream. Accordingly, the reception side can facilitate determination regarding whether or not the transport stream is the first transport stream or second transport stream, based on this stream association information, for example. Also, with the first transport stream, the reception side can facilitate determination regarding which is an elementary stream making up stereoscopic (3D) image data or scalable encoded image data, for example, based on this stream correlation information. That is to say, the reception side can adequately handle dynamic change of the contents of distribution, and perform correct stream reception.

Also, another concept of the present invention is an image data reception device including: at least a data reception unit configured to receive a first transport stream and a second transport stream in a time-sharing manner; and a data obtaining unit configured to obtain data from the first transport stream and the second transport stream received at the data reception unit; with the first transport stream including the packets obtained by packetizing a first elementary stream including first image data, and a predetermined number of second elementary streams including a predetermined number of second image data and/or meta data associated with the first image data respectively, and further includes stream association information for associating the first elementary stream with the predetermined number of second elementary streams; with the second transport stream including a packet obtained by packetizing a third elementary stream including third image data; and with the data obtaining unit obtaining, when receiving the first transport stream at the data reception unit, the first image data from this first transport stream, and further obtains, based on the stream association information, the predetermined number of second image data and/or meta data from the first transport stream, and obtaining, when receiving the second transport stream at the image data reception unit, the third image data from this second transport stream.

With the present invention, at least the first transport stream and second transport stream are received by the data reception unit in a time-sharing manner. The first transport stream includes the packets obtained by packetizing the first elementary stream including the first image data, and the predetermined number of second elementary streams including the predetermined number of second image data and/or meta data associating to this first image data respectively. Also, the second transport stream includes a packet obtained by packetizing the third video elementary stream including the third image data.

For example, the first image data is the image data of the base view making up stereoscopic (3D) image data, and the second image data is the image data of a view other than the base view (non-base view) making up stereoscopic image (3D) data. The third image data is two-dimensional (2D) image data equivalent to the above-mentioned first image data.

Also, for example, the first image data is encoded image data of the lowest level making up scalable encoded image data, and the second image data is encoded image data of a hierarchical level other than the lowest level making up scalable encoded image data. The third image data is encoded image data equivalent to the above-mentioned first image data.

Also, the first transport stream includes stream association information for associating the first elementary stream and the predetermined number of second elementary streams. For example, this stream association information is taken as information for associating the packet identifier of the first elementary stream, and the packet identifiers of the predetermined number of second video elementary streams. Also, for example, this stream association information is taken as information for associating the component tag of the first video elementary stream, and the component tags of the predetermined number of second video elementary streams.

This stream association information is inserted into a private data region of a packet (PES packet) obtained by packetizing the first elementary stream, for example. Also, the transport stream includes an event information table serving as service information for performing management in increments of events, and the stream association information is inserted under the event information table, for example. Also, the transport stream includes a program map table serving as program specific information indicating which program each of the elementary streams included in this transport stream belongs to, and the stream association information is inserted under the program map table, for example.

Image data and/or meta data is obtained by the data obtaining unit from the first transport stream and second transport stream received at the data reception unit. In this case, when the first transport stream is received, the first image data is obtained from the first transport stream, and further, the predetermined number of second image data and/or meta data is obtained from this first transport stream based on the stream association information. Also, when the second transport stream is received, the third image data is obtained from this second transport stream.

With the present invention, the stream association information for associating the first elementary stream with the predetermined number of second elementary streams is inserted into the first transport stream. Accordingly, based on this stream association information, for example, determination can be facilitated regarding whether the transport stream is the first transport stream or second transport stream. Also, based on this stream association information, with the first transport stream, determination can be facilitated regarding which is elementary stream making up stereoscopic (3D) image data or scalable encoded image data, and so forth. Accordingly, the reception side can adequately handle dynamic change of the contents of distribution, and adequately obtain image data from the transport streams.

The present invention further includes, for example, a superimposed information data output unit configured to output the data of superimposed information; and a data superimposing unit configured to superimpose the data of superimposed information output from the superimposed information data output unit on image data obtained at the data obtaining unit; with the first image data obtained at the data obtaining unit after the first transport stream is received at the data reception unit being the image data of a base view making up stereoscopic image data; with the predetermined number of second imaged data obtained at the data obtaining unit after the first transport stream is received at the data reception unit being the image data of a predetermined number of views other than the base view making up the stereoscopic image data; with the third image data obtained at the data obtaining unit after the first transport stream is received at the data reception unit being two-dimensional image data; and with the data superimposing unit adjusting, when receiving the first transport stream at the data reception unit, the superimposed position of the data of the superimposed information output from the superimposed information data output unit based on disparity information between an image according to the first image data and an image according to the predetermined number of second image data obtained at the data obtaining unit, superimposing the data of superimposed information of which this superimposed position has been adjusted on the first image data and the predetermined number of second image data, and superimposing, when receiving the second transport stream at the data reception unit, the data of the superimposed information output from the superimposed information data output unit on the third image data obtained at the data obtaining unit without change.

In this case, the data of superimposed information to be superimposed on each of the first image data and the predetermined number of second image data making up stereoscopic image data is data in which the superimposed position has been adjusted based on disparity information. Accordingly, with display of the superimposed information, perspective consistency between objects within an image can be maintained in the optimal state.

Also, another concept of the present invention is an image data reception device including: a data reception unit configured to receive a transport stream including the packets obtained by packetizing a first elementary stream including first image data, and a predetermined number of second elementary streams including a predetermined number of second image data and/or meta data relating to the first image data, and further including stream association information for associating the first elementary stream with the predetermined number of second elementary streams; and a data obtaining unit configured to obtain the first image data from the transport stream received at the data reception unit, and further to obtain the predetermined number of second image data and/or meta data from the first transport stream based on the stream association information.

With the present invention, a transport stream is received by the data reception unit. This transport stream includes the packets obtained by packetizing the first elementary stream including the first image data, and the predetermined number of second elementary streams including the predetermined number of second image data and/or meta data relating to this first image data respectively.

Also, the transport stream includes the stream association information for associating the first elementary stream and the predetermined number of second elementary streams. For example, this stream association information is taken as information for associating the packet identifier of the first elementary stream, and the packet identifiers of the predetermined number of second video elementary streams. Also, for example, this stream association information is taken as information for associating the component tag of the first video elementary stream, and the component tags of the predetermined number of second video elementary streams.

Image data and/or meta data are obtained from the transport stream received at the data reception unit by the data obtaining unit. In this case, the first image data is obtained from this transport stream, and further, the predetermined number of second image data and/or meta data are obtained from this transport stream based on the stream association information.

With the present invention, the stream association information for associating the first elementary stream and the predetermined number of second elementary streams is inserted in the transport stream. Accordingly, based on this stream association information, with the transport stream, determination can be facilitated regarding which is an elementary stream making up stereoscopic (3D) image data or scalable encoded image data, and so forth, and adequate processing can be performed, for example.

The present invention further includes, for example, a resolution adjustment unit configured to adjust the output resolutions of the first image data and the predetermined number of second image data obtained at the data obtaining unit. In this case, even when the resolution of the first image data, and the resolutions of the predetermined number of second image data differ, the output resolutions thereof can be agreed by the resolution adjustment unit.

Also, with the present invention, for example, an arrangement may be made wherein the stream association information further includes the control information of the output resolutions of the first image data and the second image data, and the resolution adjustment unit adjusts the output resolutions of the first image data and the predetermined number of second image data based on the control information of the output resolutions included in this stream association information, and displays by taking output synchronization. In this case, the resolution adjustment unit can adjust the output resolutions of the first image data and the predetermined number of second image data so as to match a predetermined resolution, for example, with one of the image data is taken as the master.

Also, with the present invention, for example, an arrangement may be made wherein the above-mentioned meta data obtained at the data obtaining unit is disparity information corresponding to stereoscopic image data, and there is further provided a post-processing unit for subjecting the first image data and second image data obtained at the data obtaining unit to interpolation processing to obtain the display image data of a predetermined number of views.

Advantageous Effects of Invention

According to the present invention, the stream association information for associating the transport stream including the first elementary stream including the first image data, and the predetermined number of second elementary streams including the second image data and/or meta data relating to this first image data respectively with these elementary streams thereof is inserted.

Therefore, the reception side can facilitate, for example, determination that this transport stream includes stereoscopic (3D) image data or scalable encoded image data, and so forth, based on this stream association information. Also, the reception side can facilitate determination such as which of this transport stream is an elementary stream making up stereoscopic (3D) image data or scalable encoded image data, and so forth. Accordingly, the reception side can adequately handle dynamic change in the contents of distribution, and perform correct stream reception.

BRIEF DESCRIPTION OF DRAWINGS

FIG. 6 is a diagram for describing the contents of each information within the stream association data "Stream_Association data".

FIG. 7 is a diagram illustrating another structural example of the stream association data "Stream_Association data" including the stream association information "Stream_Association Information".

FIG. 10 is a diagram for describing the contents of each information within the stream association descriptor "Stream_Association_descriptor".

FIG. 11 is a diagram illustrating a structural example of the stream association descriptor "Stream_Association_descriptor" including the stream association information "Stream_Association Information".

FIG. 12 is a diagram illustrating a structural example of a transport stream in the event of employing a third method (1) for inserting the stream association information as a program descriptor of a PMT.

FIG. 19 is a diagram illustrating an operation example of the receiver in the event that a first transport stream TS1 and a second transport stream TS2 are alternately transmitted.

FIG. 20 is a diagram for describing an access unit serving as an object to be decoded in a video decoder regarding the first transport stream TS1 and the second transport TS2.

FIG. 21 is a diagram for describing an access unit serving as an object to be decoded in a video decoder regarding the first transport stream TS1 and the second transport TS2.

FIG. 22 is a diagram illustrating a structural example of each stream association data "Stream_Association data" in the event of inserting M pieces of stream association information into a transport stream.

FIG. 23 is a diagram for describing the contents of each information within the stream association data "Stream_Association data".

FIG. 24 is a diagram illustrating another structural example of each stream association data "Stream_Association data" in the event of inserting M pieces of stream association information into a transport stream.

FIG. 32 is a diagram illustrating a structural example of each stream association data "Stream_Association data" in the event of inserting M pieces of stream association information into a transport stream.

FIG. 33 is a diagram for describing the contents of each information within the stream association data "Stream_Association data".

FIG. 34 is a diagram for describing the contents of each information within the stream association data "Stream_Association data".

FIG. 35 is a diagram illustrating another structural example of each stream association data "Stream_Association data" in the event of inserting M pieces of stream association information into a transport stream.

DESCRIPTION OF EMBODIMENTS

Description will be made below regarding a mode for implementing the present invention (hereafter, referred to as "embodiment"). Note that description will be made in accordance with the following sequence.
1. Embodiment
2. Modification 1. Embodiment

[Image Transmission/reception System]

Figure 1:
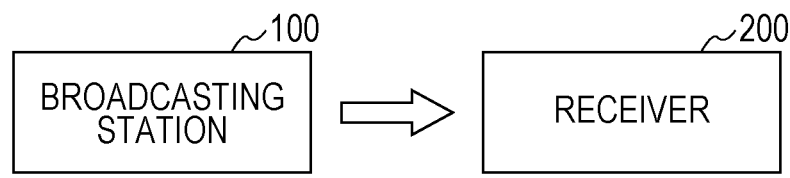
FIG. 1 is a block diagram illustrating a configuration example of an image transmission/reception system serving as a first embodiment of the present invention.

FIG. 1 illustrates a configuration example of an image transmission/reception system 10 serving as an embodiment. This image transmission/reception system 10 is configured of a broadcasting station 100 and a receiver 200. The broadcasting station 100 transmits a transport stream over broadcast waves. The broadcasting station 100 transmits at least a first transport stream and a second transport stream in a time-sharing manner.

The first transport stream is a transport stream including stereoscopic (3D) image data. This first transport stream includes a video elementary stream of the base view including the image data of the base view (Base view) making up stereoscopic image data. Note that, instead of this video elementary stream (Base view sub-bitstream), an AVC (2D) video elementary stream may be employed. The following description will be made simply as a video elementary stream of the base view.

Also, this first transport stream includes the video elementary stream of a predetermined number of non-base views (Non-Base view sub-bitstream). The video elementary stream of each non-base view includes the image data of a non-base view (Non base view) making up stereoscopic image data. In reality, the first transport stream includes the packets obtained by packetizing the video elementary streams of the base view and a non-base view. These packets are PES (Packetized Elementary Stream) packets.

Note that, in the event of stereo stereoscopic (3D) image data, the number of the image data of a non-base view making up stereoscopic image data is one. That is to say, the predetermined number is one. In this case, the image data of the base view is the image data of one of the left eye and the right eye, and the imaged data of one non-base view is the image data of the other of the left eye and the right eye.

This first transport stream includes stream association information for associating the video elementary stream of the base view, and the video elementary streams of a predetermined number of non-base views. The detailed description of the stream association information will be described later.

Also, the second transport stream is a transport stream including two-dimensional (2D) image data. This second transport stream includes, for example, the video elementary stream of two-dimensional (2D) image data, or an AVC (2D) video elementary stream. In reality, the second transport stream includes the packets (PES packets) obtained by packetizing the elementary stream of two-dimensional image data.

The receiver 200 receives the transport stream transmitted over broadcast waves from the broadcasting station 100. The receiver 200 obtains image data from the received transport stream. As described above, when the broadcasting station transmits the first transport stream and second transport stream in a time-sharing manner, the receiver 200 receives the first transport stream and second transport stream in a time-sharing manner.

When receiving the first transport stream, the receiver 200 obtains from the video elementary stream of the base view included in this first transport stream the image data of the base view. This first base transport stream includes stream association information. This stream association information is, as described above, information for associating the video elementary stream of the base view, and the video elementary streams of a predetermined number of non-base views.

When receiving this first transport stream, the receiver 200 recognizes that this is reception of the first transport stream, based on the stream association information. Further, the receiver 200 recognizes the video elementary streams of a predetermined number of non-base views associated with the video elementary stream of the base view based on this stream association information. The receiver 200 then obtains from the video elementary streams of the predetermined number of non-base views, the image data of the predetermined number of non-base views.

Also, when receiving the second transport stream, the receiver 200 obtains from the video elementary stream of two-dimensional image data included in this second transport stream the two-dimensional image data. This two-dimensional image data is equivalent to the image data of the base view making up the above-mentioned stereoscopic image data.

[Configuration Example of Transmission Data Generating Unit]

Figure 2:
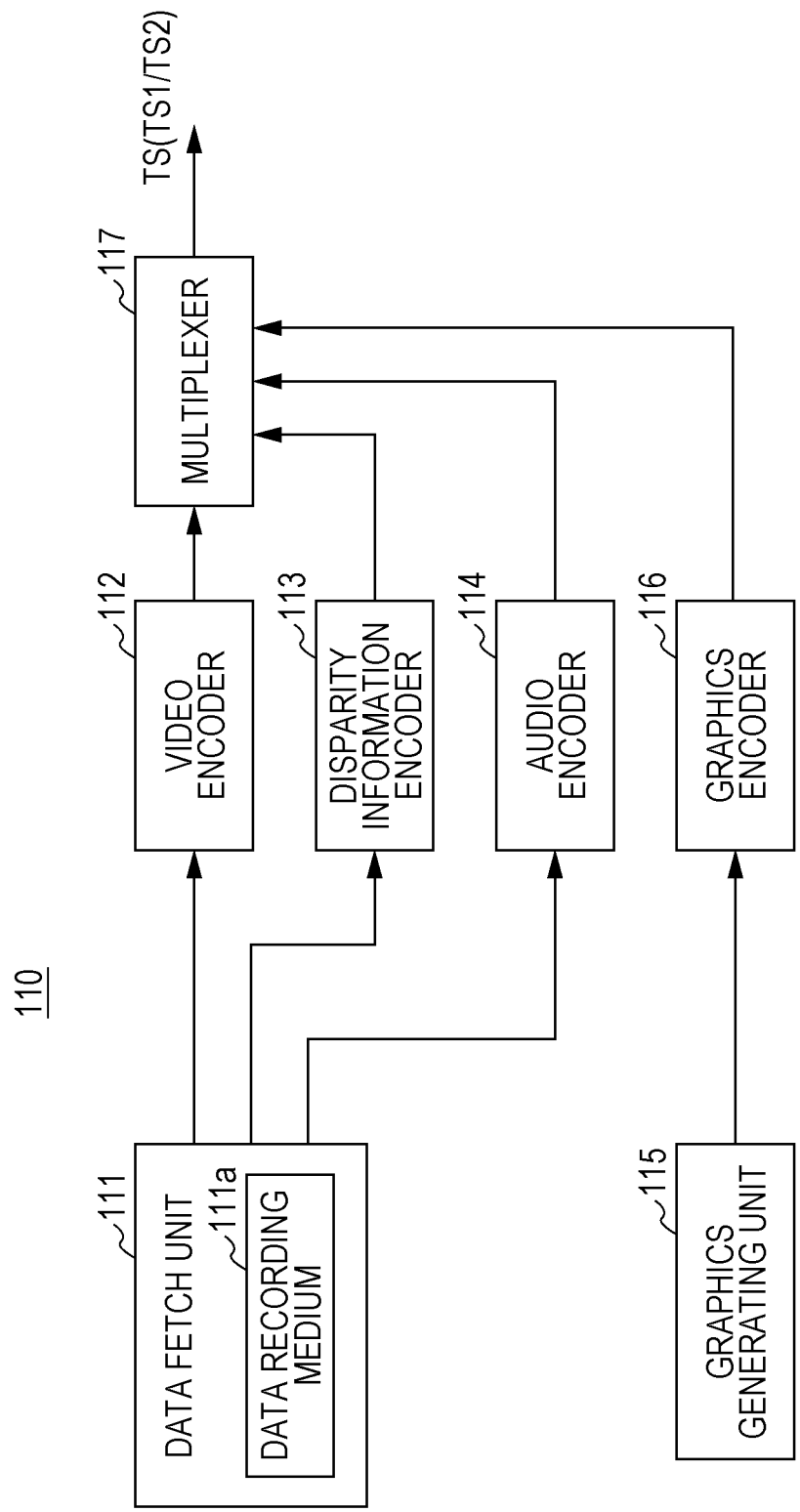
FIG. 2 is a block diagram illustrating a configuration example of a transmission data generating unit of a broadcasting station making up the image transmission/reception system.

FIG. 2 illustrates a configuration example of a transmission data generating unit 110 for generating the above-mentioned first and second transport streams at the broadcasting station 100. This transmission data generating unit 110 includes a data fetch unit (archive unit) 111, a video encoder 112, a disparity information encoder 113, and an audio encoder 114. Also, this transmission data generating unit 110 includes a graphics generating unit 115, a graphics encoder 116, and a multiplexer 117.

A data recording medium 111a is detachably mounted on the data fetch unit 111, for example. Along with the image data of a predetermined program to be transmitted using the first and second transport streams, audio data corresponding to this image data is recorded in this data recording medium 111a. For example, the image data is switched to stereoscopic (3D) image data or two-dimensional (2D) image data according to a program. Also, for example, even within a program, image data is switched to stereoscopic image data or two-dimensional image data according to the contents of the main part, commercials, and so forth. The stereoscopic image data is made up of the image data of the base view, and the image data of a predetermined number of non-base views.

In the event that the image data is stereoscopic image data, disparity information is also recorded in this data recording medium 111a in response to this stereoscopic image data. This disparity information includes a disparity vector indicating disparity between the base view and each of the non-base views, depth data, and so forth. The depth data can be handled as a disparity victor by a predetermined conversion. Examples of the disparity information include disparity information for each pixel (pixel), and the disparity information of the divided regions obtained by dividing a view (image) into a predetermined numbers.

For example, this disparity information is used, with the reception side, for adjusting the position of the same superimposed information (graphics information, etc.) to be superimposed on the images of the base view and each of the non-base views to provide disparity. Also, for example, this disparity information is used, with the reception side, for subjecting the image data of the base view and each of the non-base views to interpolation processing (post-processing) to obtain the display image data of a predetermined number of views. The data recording medium 111a is a disc-shaped recording medium, semiconductor memory, or the like. The data fetch unit 111 fetches and outputs image data, audio data, disparity information, and so forth from the data recording medium 111a.

The video encoder 112 subjects the image data output from the data fetch unit 111 to MPEG4-AVC encoding to obtain encoded video data. Also, when the image data is two-dimensional image data, this video encoder 112 generates a video elementary stream including this two-dimensional image data using a stream formatter (not shown in the drawing) provided to the subsequent stage. Also, when the image data is stereoscopic image data, the video encoder 112 generates the video elementary stream of the base view including the image data of the base view. When the image data is stereoscopic image data, the video encoder 112 further generates the video elementary streams of a predetermined number of non-base views including the image data of a predetermined number of non-base views respectively. The audio encoder 114 subjects the audio data output from the data fetch unit 111 to encoding such as MPEG-2 Audio AAC or the like to generate an audio elementary stream.

The disparity information encoder 113 subjects the disparity information output from the data fetch unit 111 to predetermined encoding to generate the elementary stream of the disparity information. Note that, in the event that the disparity information is disparity information for each pixel as described above, this disparity information can be handled like pixel data. In this case, the disparity information encoder 113 subjects the disparity information to encoding using the same encoding format as with the above-mentioned image data to generate a disparity information elementary stream. Note that, in this case, an arrangement can be conceived wherein encoding of the disparity information output from the data fetch unit 111 is performed at the video encoder 112, and in this case, the disparity information encoder 113 can be omitted.

The graphics generating unit 115 generates the data of graphics information (also including subtitle information) (graphics data) to be superimposed on an image. The graphics encoder 116 generates a graphics elementary stream including the graphics data generated at the graphics generating unit 115. Here, the graphics information makes up superimposed information.

Examples of the graphics information include logos. Examples of the subtitle information include subtitles. This graphics data is bit map data. This graphics data is appended with idling offset information indicating a superimposed position on an image. This idling offset information indicates the offset values in the vertical direction and horizontal direction from the left upper origin of an image to the left upper pixel of the superimposed position of the graphics information, for example. Note that a standard for transmitting subtitle data as bit map data has been standardized as "DVB- _Subtitling" in the DVB that is a digital broadcast standard of Europe, and has been put into practice.

The multiplexer 117 packetizes and multiplexes the elementary streams generated at the video encoder 112, disparity information encoder 113, audio encoder 114, and graphics encoder 116 to generate a transport stream TS. This transport stream TS serves as the above-mentioned first transport stream TS1 during the period of a predetermined program wherein stereoscopic (3D) image data is output from the data fetch unit 111, or during a predetermined period within a program.

This first transport stream TS1 includes the video elementary stream of the base view, and the video elementary stream of a predetermined number of non-base views as video elementary streams. The multiplexer 117 inserts stream association information for associating the video elementary stream of the base view, and the video elementary stream of the predetermined number of non-base views into this first transport stream TS1. Thus, this first transport stream TS1 includes the stream association information. The detailed description of insertion of the stream association information at the multiplexer 117 will be made later.

The transport stream TS serves as the above-mentioned second transport stream TS2 during the period of a predetermined program wherein two-dimensional (2D) image data is output from the data fetch unit 111, or during a predetermined period within a program. This second transport stream TS2 includes the video elementary stream of the two-dimensional image data as a video elementary stream.

The operation of the transmission data generating unit 110 shown in FIG. 2 will roughly be described. The image data output from the data fetch unit 111 (stereoscopic image data or two-dimensional image data) is supplied to the video encoder 112. At the video encoder 112, the image data thereof is subjected to MPEG4-AVC encoding, and a video elementary stream including the encoded video data is generated.

In this case, when the image data is stereoscopic (3D) image data, i.e., the image data of the base view, and the image data of a predetermined number of non-base views, the video elementary stream of the base view, and the predetermined number of the video elementary streams are generated. Also, in this case, when the image data is two-dimensional (2D) image data, a video elementary stream including two-dimensional image data is generated. The video elementary stream generated at the video encoder 112 in this way is supplied to the multiplexer 117.

Also, when stereoscopic image data is output from the data fetch unit 111, the disparity information corresponding to the stereoscopic image data thereof is also output from the data fetch unit 111. This disparity information is supplied to the disparity information encoder 113. At the disparity information encoder 113, the disparity information is subjected to predetermined encoding, and a disparity information elementary stream including the encoded data is generated. This disparity information elementary stream is supplied to the multiplexer 117.

Also, when image data is output from the data fetch unit 111, audio data corresponding to the image data thereof is also output from the data fetch unit 111. This audio data is supplied to the audio encoder 114. At the audio encoder 114, the audio data is subjected to encoding such as MPEG-2 Audio AAC or the like, and an audio elementary stream including the encoded audio data is generated. This audio elementary stream is supplied to the multiplexer 117.

Also, in response to the image data output from the data fetch unit 111, the data of graphics information (including subtitle information) (graphics data) to be superimposed on an image (view) is generated at the graphics generating unit 115. This graphics data is supplied to the graphics encoder 116. At the graphics encoder 116, this graphics data is subjected to predetermined encoding, and a graphics elementary stream including the encoded data is generated. This graphics elementary stream is supplied to the multiplexer 117.

At the multiplexer 117, the elementary streams supplied from the encoders are packetized and multiplexed, and a transport stream TS is generated. In this case, during the period of a predetermined program wherein two-dimensional (2D) image data is output from the data fetch unit 111, or a predetermined period within a program, a second transport stream TS2 including the video elementary stream of the two-dimensional image data is generated.

During the period of a predetermined program wherein stereoscopic (3D) image data is output from the data fetch unit 111, or a predetermined period within a program, a first transport stream TS1 including the video elementary streams of the base view and a predetermined number of non-base views is generated. Stream association information for associating the video elementary stream of the base view, and the video elementary streams of the predetermined number of non-base views is inserted into this first transport stream TS1.

[Stream Association Information and Insertion Thereof]

As described above, the multiplexer 117 inserts the stream association information into the first transport stream TS1. Specifically, at the time of stereoscopic (3D) image data being supplied from the data fetch unit 111 to generate a first transport stream TS1, the multiplexer 117 inserts the stream association information into this first transport stream TS1. The stream association information is inserted in the following first through third methods so that the reception side can adequately handle dynamic change in the streams TS1 and TS2, and perform correct stream reception.

First Method

The multiplexer 117 inserts the stream association information into a private data region of a packet (PES packet) obtained by packetizing the video elementary stream of the base view including the image data of the base view. In this case, change in the number of views of stereoscopic (3D) image data, and change from the transport stream TS1 to the transport stream TS2 can be managed in increments of PES.

Figure 3:
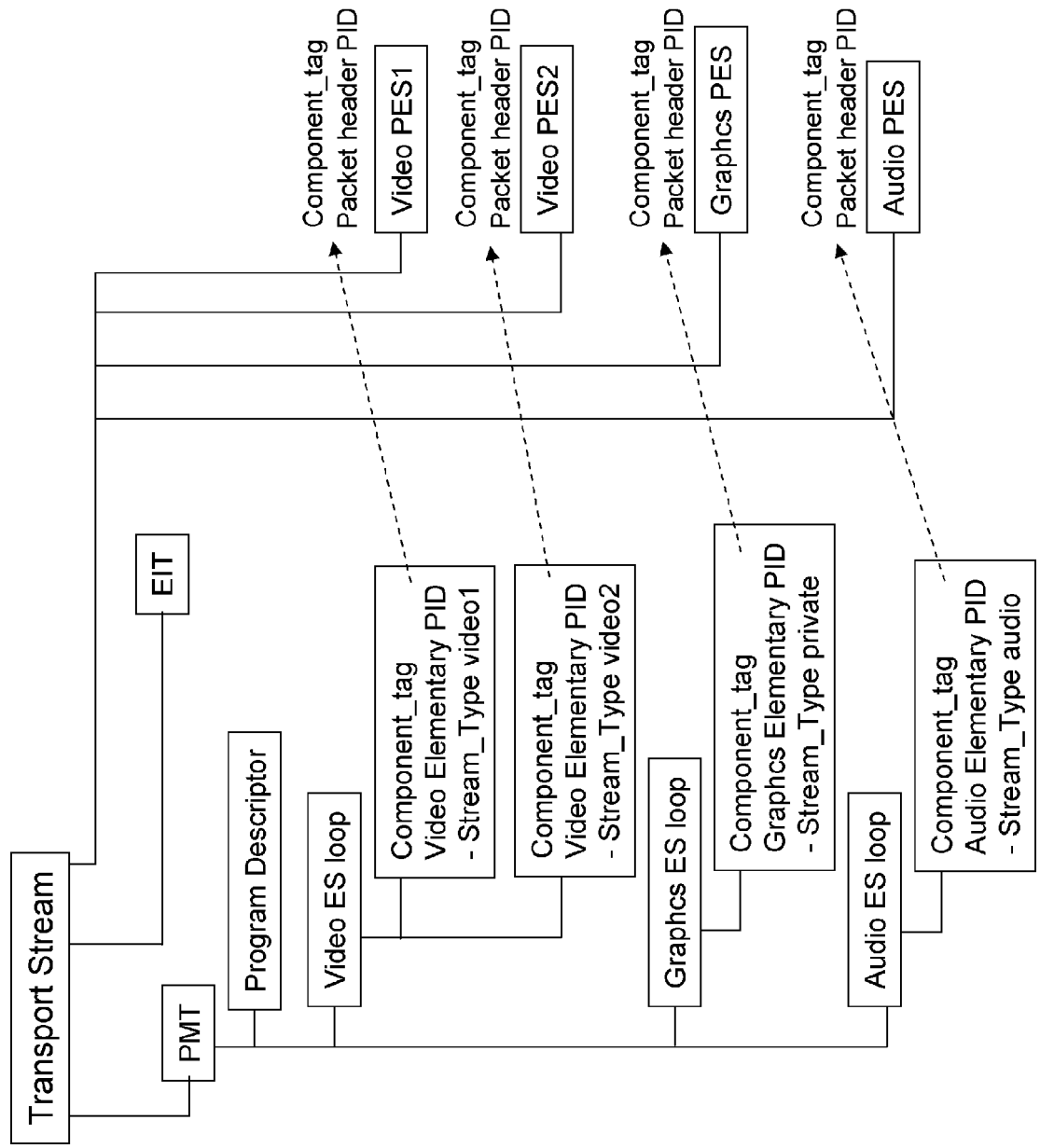
FIG. 3 is a diagram illustrating a structural example of a common transport stream including a video elementary stream, a graphics elementary stream, and an audio elementary stream.

FIG. 3 illustrates a structural example of a common transport stream including a video elementary stream, a graphics elementary stream, and an audio elementary stream. PES packets obtained by packetizing the elementary streams are included in the transport stream. With this structural example, the PES packets "Video PES1" and "Video PES2" of two video elementary streams are included. Also, with this structural example, the PES packet "Graphics PES" of the graphics elementary stream, and the PES packet "Audio PES" of the audio elementary stream are included.

Also, the transport stream includes a PMT (Program Map Table) as PSI (Program Specific Information). This PSI is information that describes which program each of the elementary streams included in the transport stream belongs to. Also, the transport stream includes an EIT (Event Information Table) as SI (Serviced Information) for performing management in increments of events.

The PMT includes a program descriptor (Program Descriptor) that describes information relating to the entire program. Also, this PMT includes an elementary loop having information relating to each of the elementary streams. This structural example includes a video elementary loop, a graphics elementary loop, and an audio elementary loop. With each of the elementary loops, information such as a component tag (Component_tag), a packet identifier (PID), a stream type (Stream_Type), and so forth is disposed for each stream, and also a descriptor that describes information relating to the elementary stream thereof is disposed though not shown in the drawing.

Figure 4:
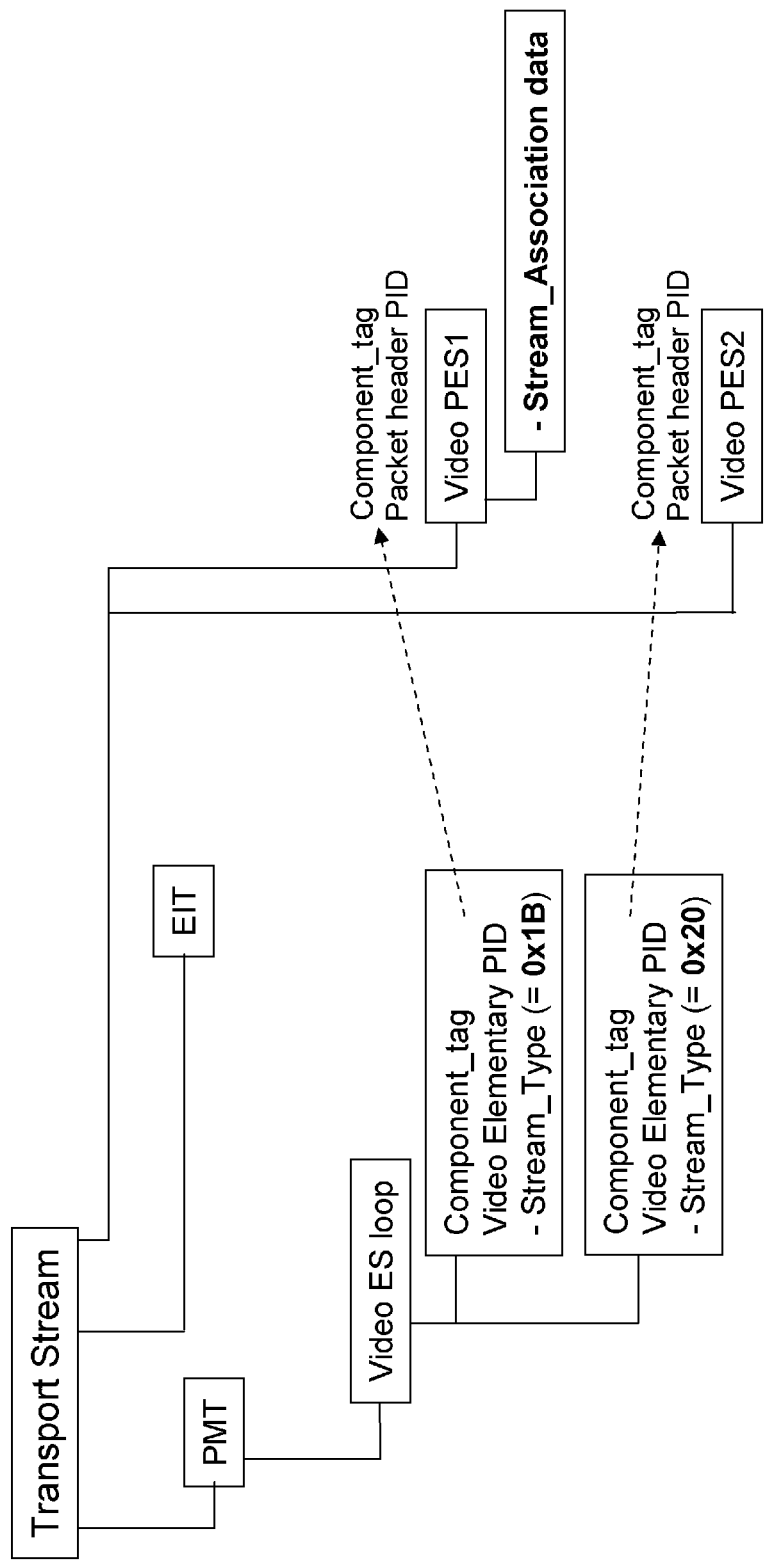
FIG. 4 is a diagram illustrating a structural example of a transport stream in the event of employing a first method for inserting stream association information into a PES packet of a video elementary stream of a base view.

FIG. 4 illustrates a structural example of a transport stream in the event of employing the first method. With this structural example, the PES packet "Video PES1" of the video elementary stream "Stream_Type=0x1B" of the base view is included in the transport stream. Also, with this structural example, the PES packet "Video PES2" of the video elementary stream "Stream_Type=0x20" of a non-base view is included in the transport stream. Note that, with this structural example, in order to simplify the drawing, with regard to audio, graphics, and so forth unnecessary for description of this first method, drawing thereof will be omitted.

With this structural example, stream association data "Stream_Association data" is inserted into a private data region of the PES packet "Video PES1" of the elementary stream of the base view. The private data region of the PES packet is a 128-bit fixed-length region. This stream association data includes stream association information "Stream_association Information". Here, according to the stream association information, the video elementary stream of the base view (Stream_Type=0x1B) is associated with the video elementary stream of the non-vase view (Stream_Type=0x20).

Figure 5:
FIG. 5 is a diagram illustrating a structural example of stream association data "Stream_Association data" including stream association information "Stream_Association Information".

FIG. 5 illustrates a structural example of the stream association data. FIG. 6 illustrates the contents of each information in the structure shown in FIG. 5. The data structural example in FIG. 5 is an example wherein association is performed by a packet identifier (PID). "Stream_association_tag" is 8-bit data indicating a data type, and indicates here that the data is the stream association data. "Stream_association_data_length" is 8-bit data indicating the length (size) of the data. This data indicates the number of bytes of "Stream_association_data_length" and thereafter as the length of the data. "Stream_count_for_association" is 4-bit data indicating the number non-base views associated with the base view, and takes a value of 0 through 15. In the event of a stereo stereoscopic image, "Stream_count_for_association=1" is set. "Stream_count_for_association=0" indicates that there is no non-base view associated with the base view. "Elementary_PID_of_minimum_view_id" is 13-bit data indicating the packet identifier (PID) of the video elementary stream of the base view.

There are the same number of "Associated_stream_Elementary_PID" as the number that "Stream_count_for_association" indicates, as to "Elementary_PID_of_minimum_view_id". This "Associated_stream_Elementary_PID" is 13-bit data indicating the packet identifier "PID" of the video elementary stream of a non-base view associated with the video elementary stream of the base view. In this way, with the data structural example in FIG. 5, the stream association information is information for associating the packet identifiers of the video elementary streams of the base view and a predetermined number of non-base views.

FIG. 7 illustrates another structural example of the stream association data. FIG. 6 also illustrates the contents of each information in the structure shown in FIG. 7. The data structural example in FIG. 7 is an example wherein association is performed using component tags (Component_tag). "Component_tag_minimum_view_id" is data disposed instead of "Elementary_PID_of_minimum_view_id" in the data structural example in FIG. 5. This data is 8-bit data indicating the component tag (Component_tag) of the video elementary stream of the base view.

There are the same number of "Component_tag_Associated_stream" as the number that "stream_count_for_association" indicates, as to "Component_tag_minimum_view_id". This "Component_tag_Associated_stream" is 8-bit data indicating the component tag (Component_tag) of the video elementary stream of a non-base view associated with the video elementary stream of the base view. In this way, with the data structural example in FIG. 7, the stream association information is information for associating the component tags (Component_tag) of the video elementary streams of the base view and predetermined number of non-base views.

Second Method

As described above, an EIT serving as SI for performing management in increments of events is included in a transport stream. The multiplexer 117 inserts stream association information under this EIT. In this case, change in the number of views of stereoscopic (3D) image data, and change from the transport stream TS1 to the transport stream TS2 can be managed in increments of events.

Figure 8:
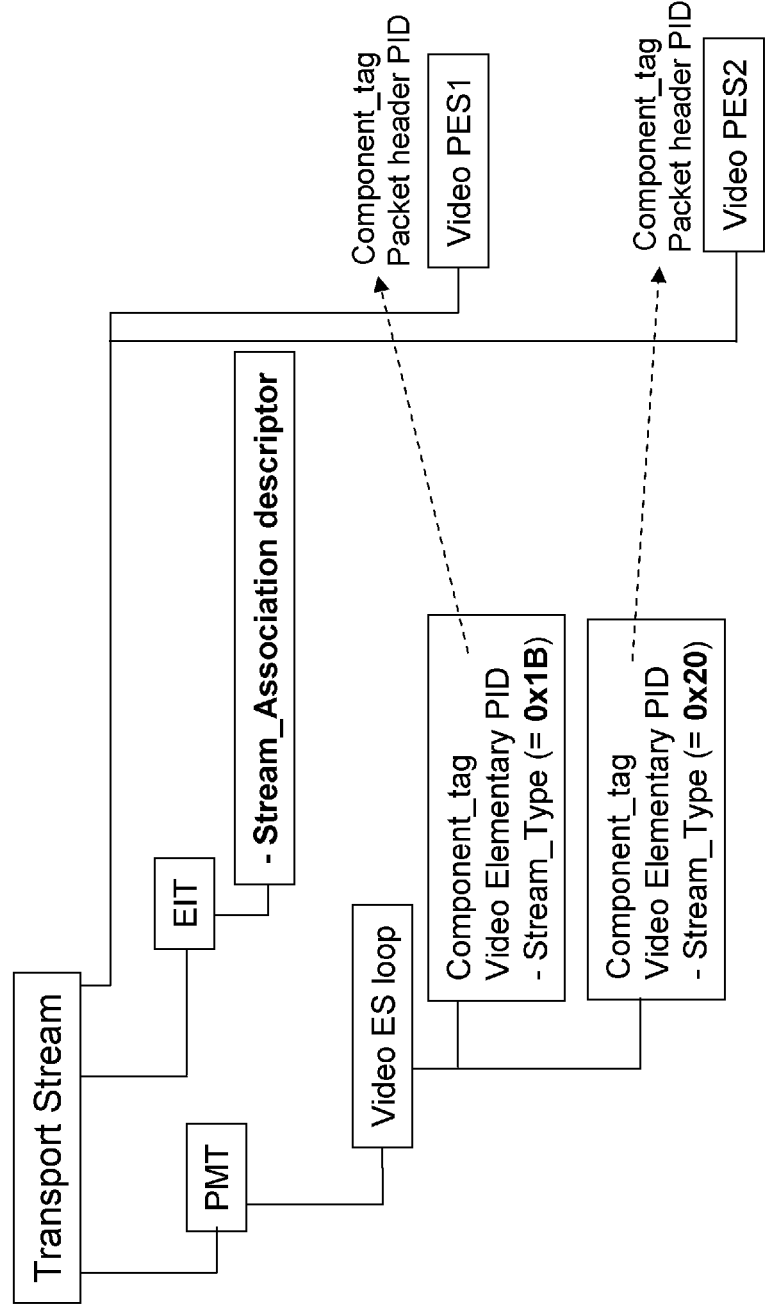
FIG. 8 is a diagram illustrating a structural example of a transport stream in the event of employing a second method for inserting the stream association information under an EIT.

FIG. 8 illustrates a structural example of a transport stream in the event of employing the second method. With this structural example, the transport stream includes the PES packet "Video PES1" of the video elementary stream (Stream_Type=0x1B) of the base view. Also, with this structural example, the transport stream includes the PES packet "Video PES2" of the video elementary stream (Stream_Type=0x20) of a non-base view. Note that, with this structural example, in order to simplify the drawing, with regard to audio, graphics, and so forth unnecessary for description of this second method, drawing thereof will be omitted.

With this structural example, a stream association descriptor "Stream_Association_descriptor" is inserted under the EIT. This stream association descriptor includes stream association information "Stream_Association_Information". Here, according to the stream association information, the video elementary stream of the base view (Stream_Type=0x1B) is associated with the video elementary stream of the non-vase view (Stream_Type=0x20).

Figure 9:
FIG. 9 is a diagram illustrating a structural example of a stream association descriptor "Stream_Association_descriptor" including the stream association information "Stream_Association Information".

FIG. 9 illustrates a structural example of the stream association descriptor. FIG. 10 illustrates the contents of each information in the structure shown in FIG. 9. The descriptor structural example in FIG. 9 is an example wherein association is performed using a packet identifier (PID). "descriptor_tag" is 8-bit data indicating a descriptor type, and indicates here that the descriptor is the stream association descriptor. "descriptor_length" is 8-bit data indicating the length (size) of the descriptor. This data indicates the number of bytes of "descriptor_length" and thereafter as the length of the descriptor. "Stream_count_for_association" is 4-bit data indicating the number non-base views associated with the base view, and takes a value of 0 through 15. In the event of a stereo stereoscopic image, "Stream_count_for_association=1" is set. "Stream_count_for_association=0" indicates that there is no non-base view associated with the base view. "Elementary_PID_of_minimum_view_id" is 13-bit data indicating the packet identifier (PID) of the video elementary stream of the base view.

There are the same number of "Associated_stream_Elementary_PID" as the number that "stream_count_for_association" indicates, as to "Elementary_PID_of_minimum_view_id". This "Associated_stream_Elementary_PID" is 13-bit data indicating the packet identifier "PID" of the video elementary stream of a non-base view associated with the video elementary stream of the base view. In this way, with the descriptor structural example in FIG. 8, the stream association information is information for associating the packet identifiers of the video elementary streams of the base view and predetermined number of non-base views.

FIG. 11 illustrates another structural example of the stream association data. FIG. 10 also illustrates the contents of each information in the structure shown in FIG. 11. The descriptor structural example in FIG. 11 is an example wherein association is performed using component tags (Component_tag). "Component_tag_minimum_view_id" is data disposed instead of "Elementary_PID_of_minimum_view_id" in the descriptor structural example in FIG. 9. This data is 8-bit data indicating the component tag (Component_tag) of the video elementary stream of the base view.

There are the same number of "Component_tag_Associated_stream" as the number that "Stream_count_for_association" indicates, as to "Component_tag_minimum_view_id". This "Component_tag_Associated_stream" is 8-bit data indicating the component tag (Component_tag) of the video elementary stream of a non-base view associated with the video elementary stream of the base view. In this way, with the descriptor structural example in FIG. 11, the stream association information is information for associating the component tags (Component_tag) of the video elementary streams of the base view and predetermined number of non-base views.

Third Method

As described above, the transport stream includes a PMT serving as PSI indicating which program each of the elementary streams included in the transport stream belongs to. The multiplexer 117 inserts stream association information under this PMT. In this case, change in the number of views of stereoscopic (3D) image data, and change from the transport stream TS1 to the transport stream TS2 can be managed in increments of programs (programs).

It can be conceived that the stream association information is inserted as a program descriptor as an example wherein the stream association information is inserted under the PMT. FIG. 12 illustrates a structural example of the transport stream in this case. With this structural example, the transport stream includes the PES packet "Video PES1" of the video elementary stream (Stream_Type=0x1B) of the base view. Also, with this structural example, the transport stream includes the PES packet "Video PES2" of the video elementary stream (Stream_Type=0x20) of a non-base view. Note that, with this structural example, in order to simplify the drawing, with regard to audio, graphics, and so forth unnecessary for description, illustration thereof in the drawings will be omitted.

With this structural example, a stream association descriptor is inserted as the program descriptor of the PMT (see FIG. 9 and FIG. 11). This stream association descriptor includes stream association information "Stream_Association_Information". Here, according to the stream association information, the video elementary stream the video elementary stream (Stream_Type=0x20) of the non-base view is associated with the video elementary stream (Stream_Type=0x1B) of the base view.

Figure 13:
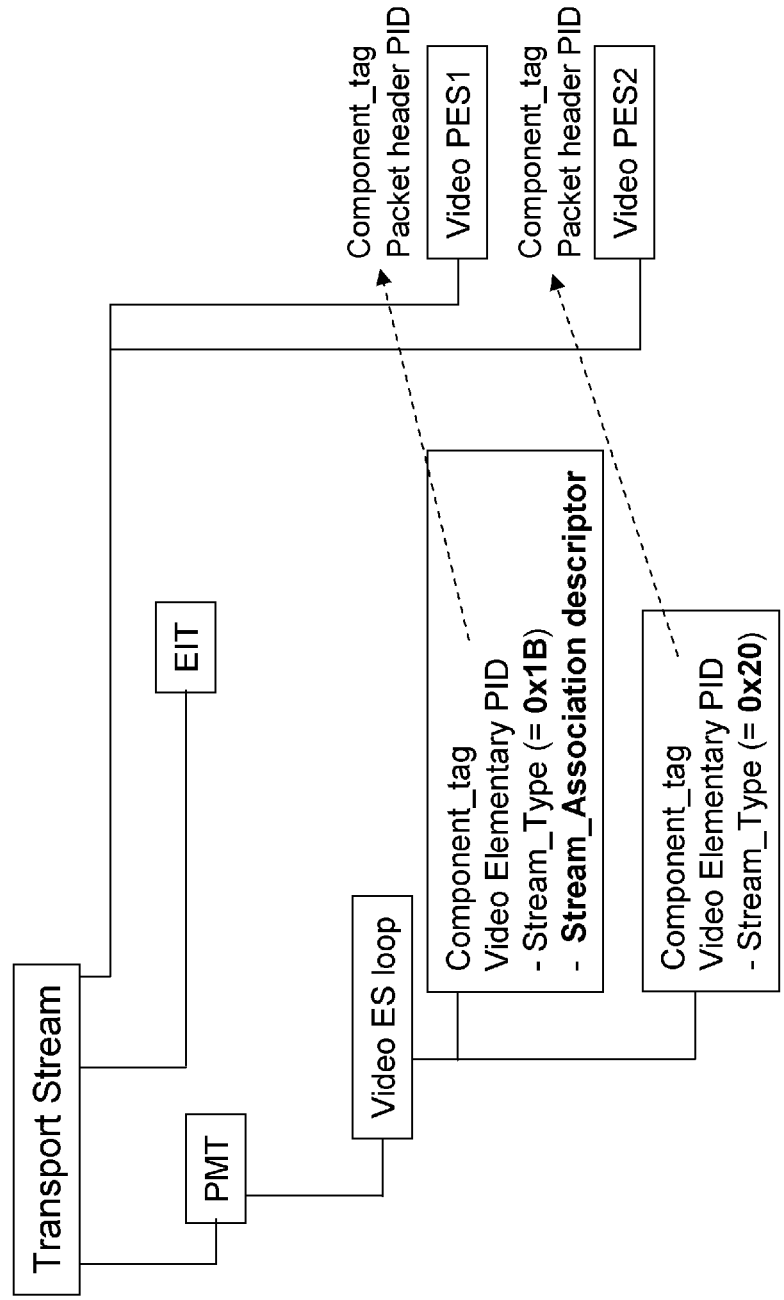
FIG. 13 is a diagram illustrating a structural example of a transport stream in the event of employing a third method (2) for inserting the stream association information under a video elementary loop (Video ES loop) of the PMT.

Also, it can be conceived that the stream association information is inserted under the video elementary loop (Video ES loop), as an example wherein the stream association information is inserted under the PMT. FIG. 13 illustrates a structural example of the transport stream in this case. With this structural example, the transport stream includes the PES packet "Video PES1" of the video elementary stream (Stream_Type=0x1B) of the base view. Also, with this structural example, the transport stream includes the PES packet "Video PES2" of the video elementary stream (Stream_Type=0x20) of a non-base view. Note that, with this structural example, in order to simplify the drawing, with regard to audio, graphics, and so forth unnecessary for description, illustration thereof in the drawings will be omitted.

With this structural example, a stream association descriptor (see FIG. 9 and FIG. 11) is inserted as a descriptor that describes information relating to the video elementary stream of the base view of the video elementary loop of the PMT (Video ES loop). This stream association descriptor includes stream association information "Stream_Association_Information". Here, according to the stream association information, the video elementary stream (Stream_Type=0x20) of the non-base view is associated with the video elementary stream (Stream_Type=0x1B) of the base view.

Note that, as described above, the multiplexer 117 inserts the stream association information into the first transport stream TS1, but does not insert the stream association information into the second transport stream TS2. That is to say, the multiplexer 117 inserts neither the above-mentioned stream association data (see FIG. 5 and FIG. 7) nor the stream association descriptor (see FIG. 9 and FIG. 11) into the second transport stream TS2.

Figure 14:
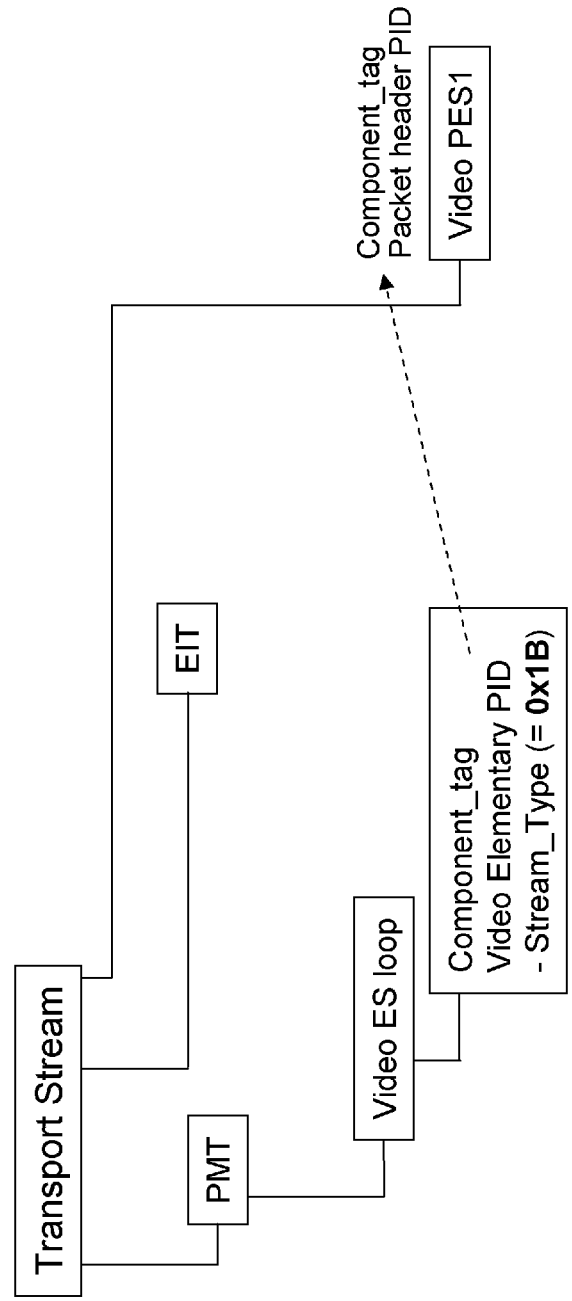
FIG. 14 is a diagram illustrating a structural example of a transport stream including two-dimensional (2D) image data.

FIG. 14 illustrates a structural example of the second transport stream. With this structural example, the transport stream includes the PES packet "Video PES1" of the video elementary stream (Stream_Type=0x1B) including two-dimensional (2D) image data. Note that, with this structural example, in order to simplify the drawing, with regard to audio, graphics, and so forth, illustration thereof in the drawings will be omitted.

Configuration Example of Receiver

Figure 15:
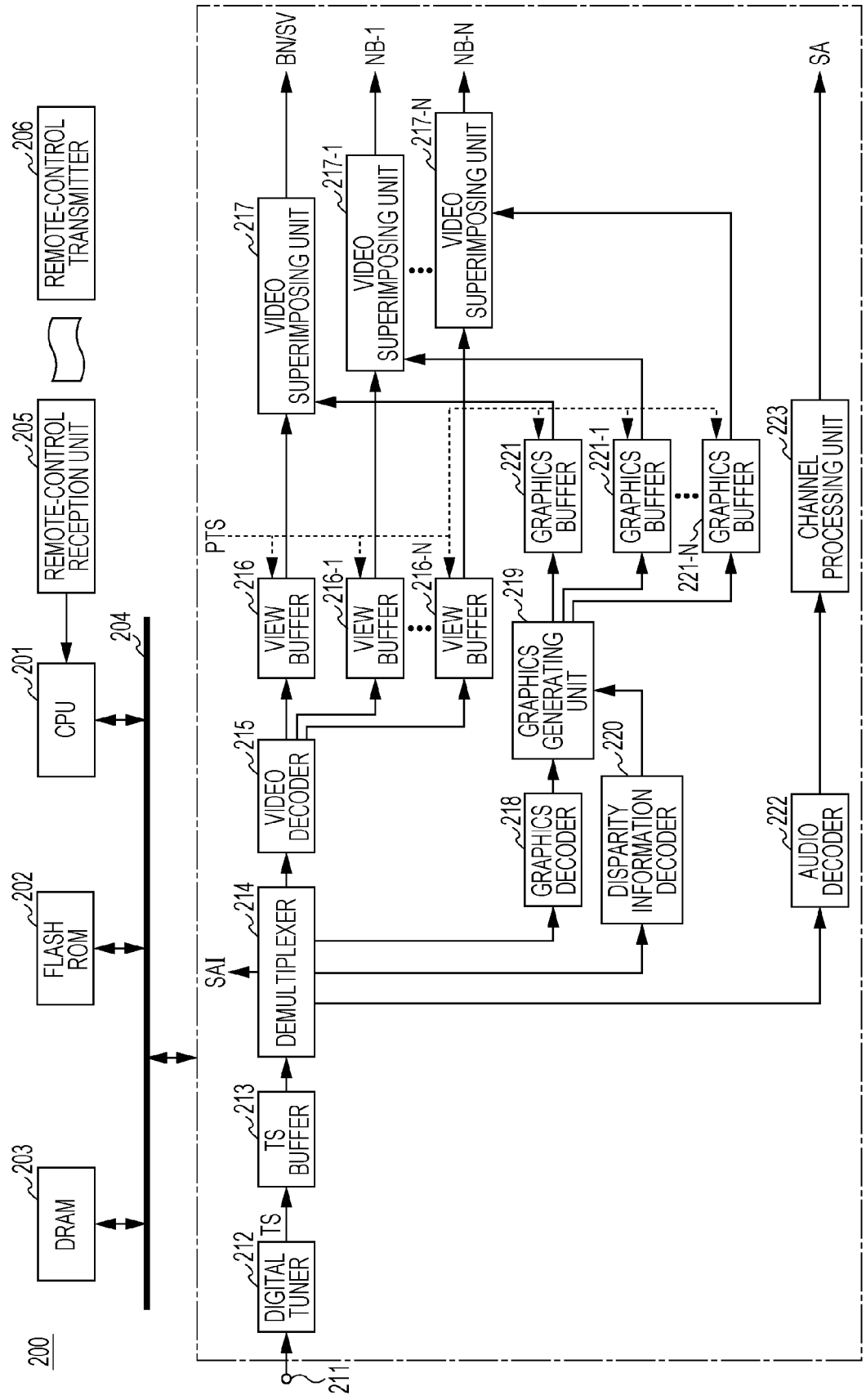
FIG. 15 is a block diagram illustrating a configuration example of a receiver making up the image transmission/reception system.

FIG. 15 illustrates a configuration example of the receiver 200. This receiver 200 includes a CPU 201, flash ROM 202, DRAM 203, an internal bus 204, a remote-control reception unit 205, and a remote-control transmitter 206. Also, this receiver 200 includes an antenna terminal 211, a digital tuner 212, a transport stream buffer (TS buffer) 213, and a demultiplexer 214.

Also, the receiver 200 includes a video decoder 215, view buffers 216, and 216-1 through 216-N, and video superimposing units 217, and 217-1 through 217-N. Further, the receiver 200 includes a graphics decoder 218, a graphics generating unit 219, a disparity information decoder 220, graphics buffers 221, and 221-1 through 221-N, an audio decoder 222, and a channel processing unit 223.

The CPU 201 controls the operation of each of the units of the receiver 200. The flash ROM 202 performs storage of control software, and storage of data. The DRAM 203 makes up a work area of the CPU 201. The CPU 201 loads the software or data read out from the flash ROM 202 on the DRAM 203, activates the software, and controls the units of the receiver 200. The remote-control reception unit 205 receives a remote control signal (remote control code) transmitted from the remote-control transmitter 206, and supplies to the CPU 201. The CPU 201 controls the units of the receiver 200 based on this remote-control code. The CPU 201, flash ROM 202, and DRAM 203 are connected to the internal bus 204.

The antenna terminal 211 is a terminal for inputting a television broadcast signal received at a reception antenna (not shown). The digital tuner 212 processes the television broadcast signal input to the antenna terminal 211, and outputs a predetermined transport stream (bit stream data) TS corresponding to a user's selected channel. The transport stream buffer (TS buffer) 213 temporarily accumulates the transport stream TS output from the digital tuner 212.

This transport stream TS is, as described above, the first transport stream TS1 or second transport stream TS2. The first transport stream TS1 includes the video elementary stream of stereoscopic (3D) image data. Specifically, this first transport stream TS1 includes the video elementary stream of the base view, and the video elementary streams of a predetermined number, here, N non-base views as video elementary streams.

Also, stream association information SAI (Stream Association Information) for associating the video elementary streams of the base view and N non-base views is inserted into the first transport stream TS1. Also, the first transport stream TS1 also includes the elementary streams of graphics, disparity information, and audio.

The second transport stream TS2 includes the video elementary stream of two-dimensional image data as a video elementary stream. Also, the second transport stream TS2 includes the elementary streams of graphics and audio.

The demultiplexer 214 extracts the elementary streams of video, disparity information, graphics, and audio from the transport stream TS temporarily accumulated in the TS buffer 213. The disparity information elementary stream is extracted only in the event that the transport stream TS is the first transport stream TS1 including the video elementary stream of stereoscopic (3D) image data. Also, the demultiplexer 214 extracts the stream association information SAI when the transport stream TS is the first transport stream TS1, and supplies to the CPU 201.

Upon the stream association information SAI being supplied, the CPU 201 recognizes that the output transport stream TS of the digital tuner 212 is the first transport stream TS1 including stereoscopic (3D) image data. The CPU 201 then sets the units of the receiver 200 in the reception processing state (3D processing state) of the first transport stream TS1. On the other hand, upon no stream association information SAI being supplied, the CPU 201 recognizes that the output transport stream TS of the digital tuner 212 is the second transport stream TS2 including two-dimensional (2D) image data. The CPU 201 then sets the units of the receiver 200 in the reception processing state (2D processing state) of the second transport stream TS2.

Figure 16:
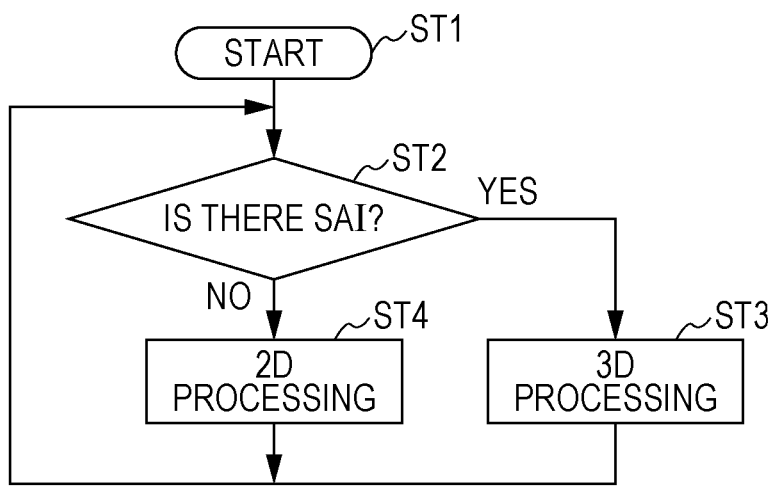
FIG. 16 is a flowchart illustrating a control processing procedure of a CPU of the receiver based on with/without stream association information SAI.

The flowchart in FIG. 16 illustrates the procedure of the control processing of the CPU 201. In step ST1, the CPU 201 starts the processing, and then proceeds to processing in step ST2. In step ST2, the CPU 201 determines whether or not the stream association information SAI has been supplied. Upon the stream association information SAI being supplied, in step ST3 the CPU 201 sets the units of the receiver 200 to the reception processing state (3D processing state) of the first transport stream TS1, and then returns to the processing in step ST2. On the other hand, upon no stream association information SAI being supplied, in step ST4 the CPU 201 sets the units of the receiver 200 in the reception processing state (2D processing state) of the second transport stream TS2, and then returns to the processing in step ST2.

Returning to FIG. 15, the demultiplexer 214 extracts the video elementary streams of the base view and N non-base views from the first transport stream TS1 as video elementary streams when being set to the 3D processing state by the control of the CPU 201.

In this case, the demultiplexer 214 extracts a video elementary stream of which the stream type "Stream_Type" is "0x1B" as the video elementary stream of the base view. Also, the demultiplexer 214 extracts the video elementary streams of the N non-base views associated with the base view. In this case, the demultiplexer 214 takes advantage of the packet identifiers (PID) of the video elementary streams of the N non-base views included in the stream association information SAI.

Also, the demultiplexer 214 extracts the stream of two-dimensional (2D) image data from the second transport stream TS2 as a video elementary stream when being set to the 2D processing state by the control of the CPU 201. In this case, the demultiplexer 214 extracts a video elementary stream of which the stream type "Stream_Type" is "0x1B".

The video decoder 215 performs the opposite processing of the above-mentioned video encoder 112 of the transmission data generating unit 110. Specifically, this video decoder 215 subjects encoded image data included in the video elementary stream extracted at the demultiplexer 214 to decoding processing to obtain decoded image data.

When being set to the 3D processing state by the control of the CPU 201, the video decoder 215 processes the video elementary stream of the base view extracted at the demultiplexer 214 to obtain the image data of the base view. Also, when being set to the 3D processing state by the control of the CPU 201, the video decoder 215 processes the video elementary streams of the N non-base views extracted at the demultiplexer 214 to obtain the image data of the N non-base views.

Also, when being set to the 2D processing state by the control of the CPU 201, the video decoder 215 processes the video elementary stream of two-dimensional image data extracted at the demultiplexer 214 to obtain two-dimensional image data.

When being set to the 3D processing state by the control of the CPU 201, the view buffer (video buffer) 216 temporarily accumulates the image data of the base view obtained at the video decoder 215. Also, when being set to the 2D processing state by the control of the CPU 201, the view buffer 216 temporarily accumulates two-dimensional image data obtained at the video decoder 215. Also, when being set to the 3D processing state by the control of the CPU 201, the view buffers (video buffers) 216-1 through 216-N temporarily accumulate the image data of each of the N non-base views obtained at the video decoder 215.

The graphics decoder 218 performs the opposite processing of the above-mentioned graphics encoder 116 of the transmission data generating unit 110. Specifically, the graphics decoder 218 subjects encoded graphics data included in the graphics elementary stream extracted at the demultiplexer 214 to decoding processing to obtained decoded graphics data (including subtitle data).

The disparity information decoder 220 performs the opposite processing of the above-mentioned disparity information encoder 113 of the transmission data generating unit 110. Specifically, the disparity information decoder 220 subjects encoded disparity information included in the disparity information elementary stream extracted at the demultiplexer 214 to decoding processing to obtain decoded disparity information. This disparity information includes a disparity vector indicating disparity between the base view and each of the non-base views, depth data, and so forth. The depth data can be handled as a disparity vector according to predetermined conversion. Examples of the disparity information include disparity information for each pixel (pixel), and the disparity information of each of the divided regions obtained by dividing a view (image) into a predetermined number.

The graphics generating unit 219 generates the data of graphics information to be superimposed on an image based on the graphics data obtained at the graphics decoder 218. When being set to the 3D processing state by the control of the CPU 201, the graphics generating unit 219 generates the data of graphics information to be superimposed on the image data of each view. In this case, the graphics generating unit 219 adjusts the superimposed position of graphics information to be superimposed on the image of each view, and provides disparity to each, based on the disparity information obtained at the disparity information decoder 220. Also, when being set to the 2D processing state by the control of the CPU 201, the graphics generating unit 219 generates the data of graphics information to be superimposed on two-dimensional image data.

When being set to the 3D processing state by the control of the CPU 201, the graphics buffer 221 temporarily accumulates the data of graphics information to be superimposed on the image data of the base view, generated at the graphics generating unit 219. Also, when being set to the 2D processing state by the control of the CPU 201, the graphics buffer 221 temporarily accumulates the data of graphics information to be superimposed on two-dimensional image data, generated at the graphics generating unit 219. Also, when being set to the 3D processing state by the control of the CPU 201, the graphics buffers 221-1 through 221-N temporarily accumulate the data of graphics information to be superimposed on each of the imaged data of the N non-base views obtained at the video decoder 215.

When being set to the 3D processing state by the control of the CPU 201, the video superimposing unit (display buffer) 217 outputs image data BV for displaying a base view image on which graphics information is superimposed. At this time, the video superimposing unit 217 superimposes the data of graphics information accumulated in the graphics buffer 221 on the image data of the base view accumulated in the view buffer 216 to obtain the image data BV. Also, when being set to the 2D processing state by the control of the CPU 201, the video superimposing unit 217 outputs image data SV for displaying a two-dimensional image on which graphics information is superimposed. At this time, the video superimposing unit 217 superimposes the data of the graphics information accumulated in the graphics buffer 221 on the two-dimensional image data accumulated in the view buffer 216 to obtain the image data SV.

Also, when being set to the 3D processing state by the control of the CPU 201, the video superimposing units (display buffers) 217-1 through 217-N output image data NB-1 through NB-N for displaying each of the N non-base view images on which graphics information is superimposed. At this time, the video superimposing units 217-1 through 217-N superimpose the data of graphics information accumulated in each of the graphics buffers 221-1 through 221-N on the image data of the base view accumulated in each of the view buffers 216-1 through 216-N. Note that transfer synchronization from the view buffers 216, and 216-1 through 216-N to the video superimposing units 217, and 217-1 through 217-N is taken by a timestamp PTS.

The audio decoder 222 performs the opposite processing of the above-mentioned audio encoder 114 of the transmission data generating unit 110. Specifically, this audio decoder 222 subjects encoded audio data included in the audio elementary stream extracted at the demultiplexer 214 to decoding processing to obtain decoded audio data. The channel processing unit 223 generates and outputs audio data SA of each channel for realizing, for example, 5.1-ch surround or the like as to the audio data obtained at the audio decoder 222.

The operation of the receiver 200 will simply be described. The television broadcast signal input to the antenna terminal 211 is supplied to the digital tuner 212. At this digital tuner 212, the television broadcast signal is processed, and a predetermined transport stream TS corresponding to the user's selected channel is output. This transport stream TS is temporarily accumulated in the TS buffer 213.

At the demultiplexer 214, the elementary streams of video, disparity information, graphics, and audio are extracted from the transport stream TS temporarily accumulated in the TS buffer 213. The disparity information elementary stream is extracted only in the case that the transport stream TS is the first transport stream TS1 included in the video elementary stream of stereoscopic (3D) image data. Also, at the demultiplexer 214, the stream association information SAI is extracted when the transport stream TS is the first transport stream TS1, and supplied to the CPU 201.

At the time of the stream association information SAI being supplied, the CPU 201 recognizes that the output transport stream TS of the digital tuner 212 is the first transport stream TS1 including stereoscopic (3D) image data. The units of the receiver 200 are then set to the reception processing state (3D processing state) of the first transport stream TS1. On the other hand, at the time of no stream association information SAI being supplied, the CPU 201 recognizes that the output transport stream TS of the digital tuner 212 is the second transport stream TS2 including two-dimensional (2D) image data. The units of the receiver 200 are then set to the reception processing state (2D processing state) of the second transport stream TS2.

Figure 17:
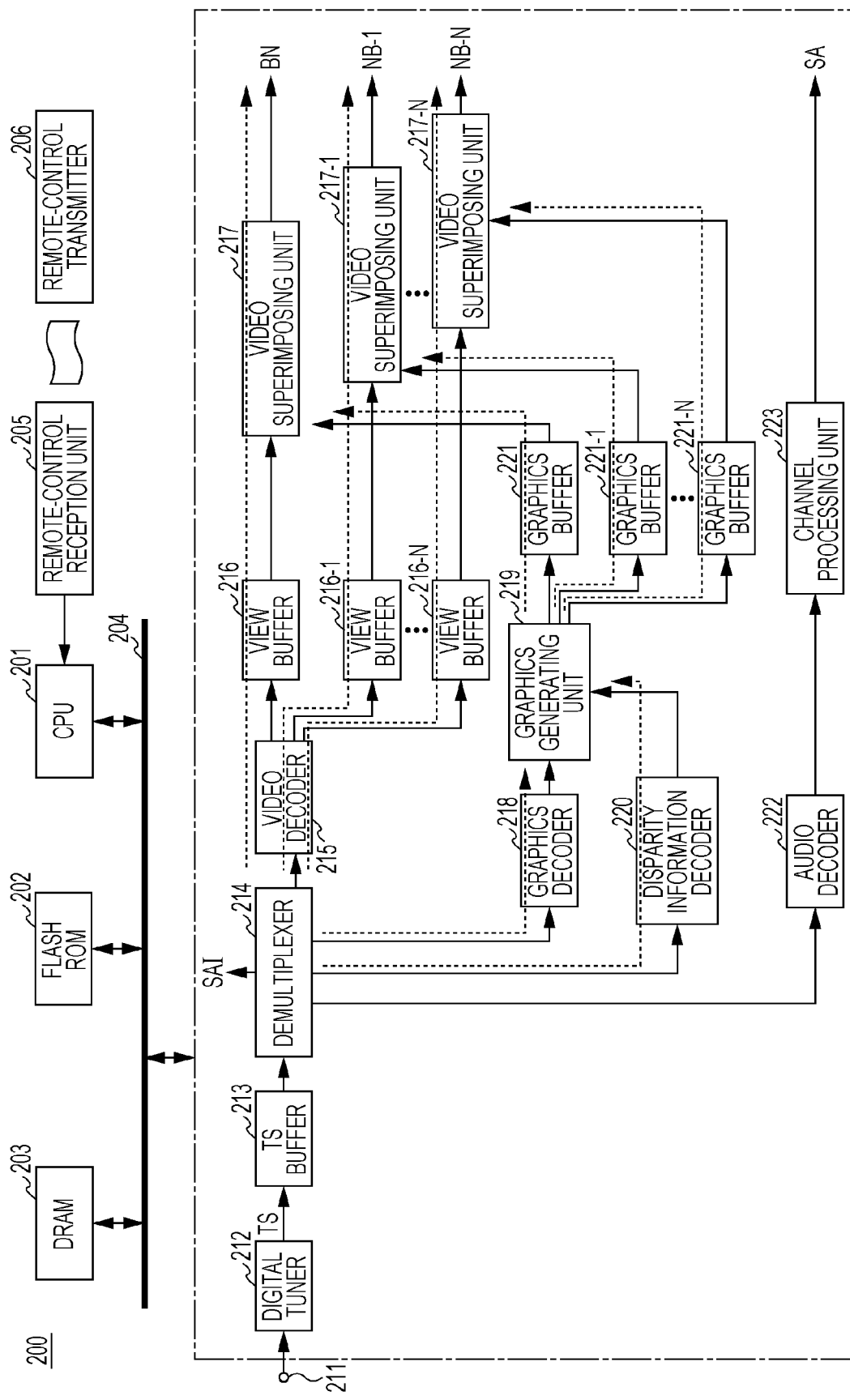
FIG. 17 is a diagram for describing operation in the event that the units of the receiver are in a 3D processing state (reception processing state of a first transport stream TS1 including stereoscopic (3D) image data).

Hereafter, description will be made regarding a case where the units of the receiver 200 are set to the reception processing state (3D processing state) of the first transport stream TS1, with reference to FIG. 17. In this FIG. 17, a dashed line indicates the flow of data, information, or a signal.

At the demultiplexer 214, the video elementary streams of the base view and N non-base views are extracted from the first transport stream TS1 as video elementary streams. These video elementary streams are supplied to the video decoder 215. At the video decoder 215, encoded image data included in the video elementary stream extracted at the demultiplexer 214 is subjected to decoding processing, and decoded image data is obtained.

In this case, the video elementary stream of the base view extracted at the demultiplexer 214 is processed, and the image data of the base view is obtained. The image data of this base view is temporarily accumulated in the view buffer 216. Also, the video elementary streams of the N non-base views extracted at the demultiplexer 214 are processed, and the image data of the N non-base views are obtained. The image data of the N non-base views are temporarily accumulated in the N view buffers 216-1 through 216-N, respectively.

Also, at the demultiplexer 214, a graphics elementary stream is extracted from the first transport stream TS1. This graphics elementary stream is supplied to the graphics decoder 218. At this graphics decoder 218, encoded graphics data included in the graphics elementary stream is subjected to decoding processing, and decoded graphics data (including subtitle data) is obtained. This graphics data is supplied to the graphics generating unit 219.

Also, at the demultiplexer 214, a disparity information elementary stream is extracted from the first transport stream TS1. This disparity information elementary stream is supplied to the disparity information decoder 220. At this disparity information decoder 220, encoded disparity information included in the disparity information elementary stream is subjected to decoding processing, and decoded disparity information is obtained. This disparity information is supplied to the graphics generating unit 219.

At the graphics generating unit 219, the data of graphics information to be superimposed on an image is generated based on the graphics data obtained at the graphics decoder

218. In this case, at the graphics generating unit 219, based on the disparity information obtained at the disparity information decoder 220, the superimposed position of the graphics information to be superimposed on the image of each view is adjusted, and disparity is provided to each. At the graphics buffer 221, the data of the graphics information to be superimposed on the image data of the base view, generated at the graphics generating unit 219, is temporarily accumulated. Also, at the graphics buffers 221-1 through 221-N, the data of the graphics information to be superimposed on the image data of the N non-base views, generated at the graphics generating unit 219, is temporarily accumulated, respectively.

At the video superimposing unit 217, the data of the graphics information accumulated in the graphics buffer 221 is superimposed on the image data of the base view accumulated in the view buffer 216, and the image data BV is obtained. This image data BV is output as image data for displaying the base view image on which the graphics information is superimposed. Also, at the video superimposing units 217-1 through 217-N, imaged data NB-1 through NB-N are obtained. In this case, at the video superimposing units 217-1 through 217-N, the data of the graphics information accumulated in the graphics buffers 221-1 through 221-N is superimposed on the imaged data of the base view accumulated in the view buffers 216-1 through 216-N. The image data NB-1 through NB-N are output as image data for displaying the N non-base view images on which the graphics information is superimposed.

Figure 18:
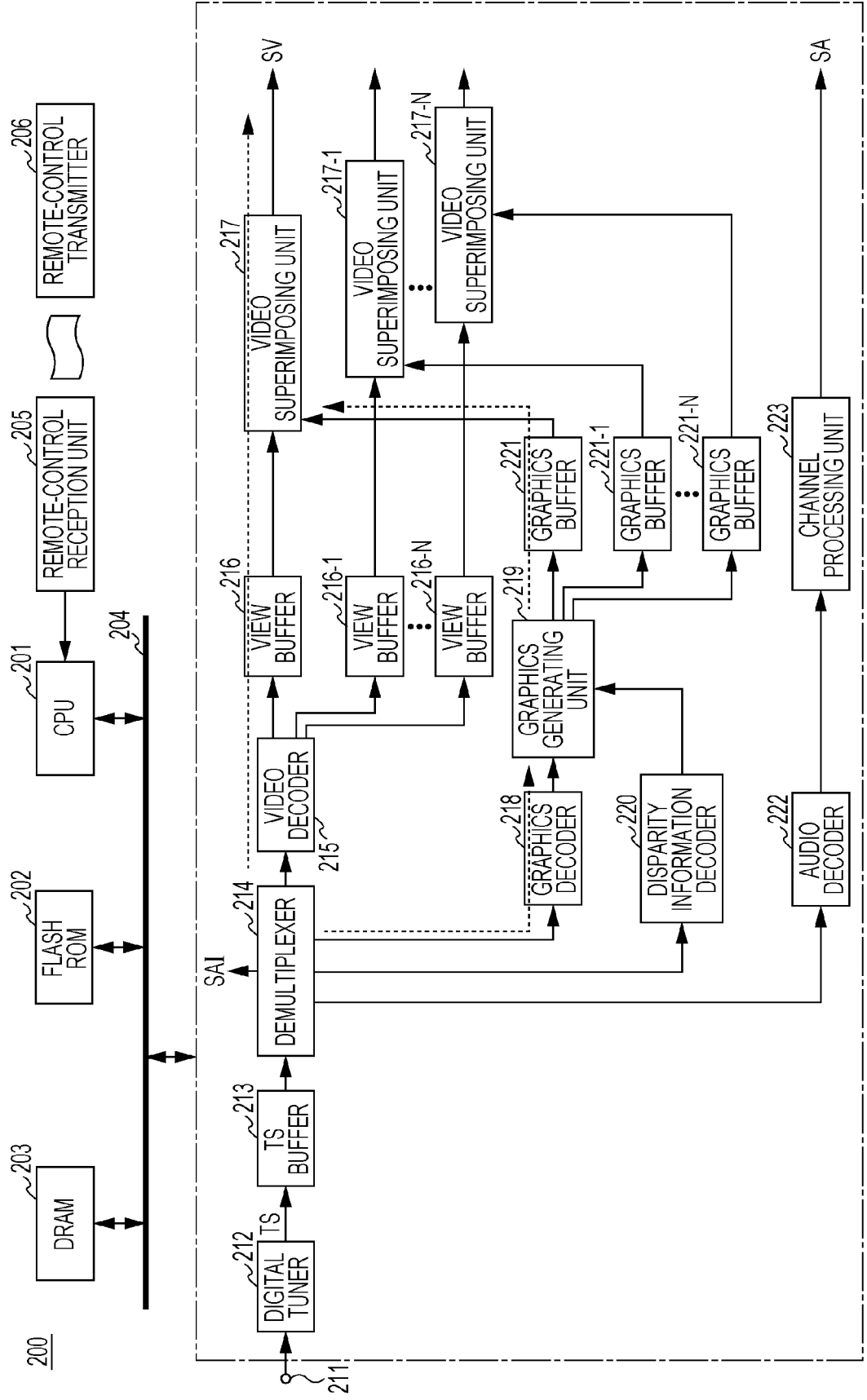
FIG. 18 is a diagram for describing operation in the event that the units of the receiver are in a 2D processing state (reception processing state of a second transport stream TS2 including two-dimensional (2D) image data).

Next, description will be made regarding a case where the units of the receiver 200 are set to the reception processing state (2D processing state) of the second transport stream TS2, with reference to FIG. 18. In this FIG. 18, a dashed line indicates the flow of data, information, or a signal.

At the demultiplexer 214, a video elementary stream including two-dimensional (2D) image data is extracted from the second transport stream TS2 as a video elementary stream. This video elementary stream is supplied to the video decoder 215. At the video decoder 215, encoded image data included in the video elementary stream extracted at the demultiplexer 214 is subjected to decoding processing, and decoded two-dimensional (2D) image data is obtained. This two-dimensional image data is temporarily accumulated in the view buffer 216.

Also, at the demultiplexer 214, a graphics elementary stream is extracted from the second transport stream TS2. This graphics elementary stream is supplied to the graphics decoder 218. At this graphics decoder 218, encoded graphics data included in the graphics elementary stream is subjected to decoding processing, and decoded graphics data (including subtitle data) is obtained. This graphics data is supplied to the graphics generating unit 219.

At the graphics generating unit 219, based on the graphics data obtained at the graphics decoder 218, the data of graphics information to be superimposed on an image is generated. The data of this graphics information is temporarily accumulated in the graphics buffer 221. At the video superimposing unit 217, the data of the graphics information accumulated in the graphics buffer 221 is superimposed on the two-dimensional (2D) image data accumulated in the view buffer 216, and the image data SV is obtained. This image data SV is output as image data for displaying a two-dimensional image on which the graphics information is superimposed.

Also, the audio elementary stream extracted at the demultiplexer 214 is supplied to the audio decoder 222. At this audio decoder 222, encoded audio data included in the audio elementary stream is subjected to decoding processing, and decoded audio data is obtained. This audio data is supplied to the channel processing unit 223. At the channel processing unit 223, audio data SA of each channel for realizing, for example, 5.1-ch surround or the like is generated and output as to the audio data thereof.

As described above, with the image transmission/reception system 10 shown in FIG. 1, stream association information is inserted into the first transport stream TS1 including the stereoscopic (3D) image data transmitted from the broadcasting station 100. According to this stream association information, the video elementary stream of the base view, and the video elementary streams of a predetermined number (N) non-base views are associated.

Accordingly, the receiver 200 can adequately handle dynamic change of the first transport stream TS1, and the second transport stream TS2 including two-dimensional (2D) image data, i.e., dynamic change in the contents of distribution, and perform correct stream reception. FIG. 19 illustrates an example of a case where the first transport stream TS1 and the second transport stream TS2 are alternately transmitted.

During a period of tn−1, the first transport stream TS1 is transmitted. This first transport stream TS1 includes the video elementary stream (Stream_Type=0x1B) of the base view, and the video elementary stream (Stream_Type=0x20) of a non-base view. Note that, here, an example is shown wherein an AVC (2D) video elementary stream is used as the video elementary stream of the base view. Also, the first transport stream TS1 includes stream association information SAI (Stream Association Information), and two video elementary streams are associated with packet identifiers (PID).

Accordingly, the receiver 200 can readily recognize that the first transport stream TS1 has been transmitted. Also, the receiver 200 can readily recognize the video elementary stream of a non-base view associated with the video elementary stream of the base view. Accordingly, the receiver 200 is in a reception state of stereoscopic (3D) image data during this tn−1 period. Accordingly, the receiver 200 can correctly perform reception of the first transport stream TS1, and obtain the image data of the base view and a non-base view making up stereoscopic (3D) image data.

Also, during a period of to following the period of tn−1, the second transport stream TS2 is transmitted. This second transport stream TS2 includes no stream association information SAI. Accordingly, the receiver 200 can readily recognize that the second transport stream TS2 has been transmitted, and is in a reception state of two-dimensional (2D) image data during the period of tn−1. Accordingly, the receiver 200 can correctly perform reception of the second transport stream TS2, and obtain two-dimensional (2D) image data.

Further, during a period of tn+1 following the period of tn, the first transport stream TS1 is transmitted. During the period of tn+1, in the same way as the above-mentioned period of tn−1, the receiver 200 can correctly perform reception of the first transport stream TS1, and obtain stereoscopic (3D) imaged data, based on the stream association information SAI.

FIG. 20 and FIG. 21 illustrate access units (Access Unit) serving as objects to be decoded at the video decoder 215 (see FIG. 15) regarding the first transport stream TS1 and second transport stream TS2 in FIG. 19. In the event that there is the elementary stream of a non view associated with the elementary stream of the base view by the stream association information SAI, a packet such as shown in FIG. 20 (NAL packet) is identified from the supplied stream, and decoding processing is advanced for each MVC access unit (MVC Access Unit) as shown in FIG. 21. On the other hand, in the event that determination is made that there is only the stream of two-dimensional (2D) image data, decoding processing is advanced with only the portion of the AVC access unit (AVC Access Unit) in FIG. 21.

Note that, with a change point between 2D and 3D, it is requested for the transmission side and the reception side to be synchronized in increments of frames. This request can be satisfied by switching image data using a packet indicating the information of the top of the video sequence, or the like, along with change regarding whether or not there is stream association information SAI.

Also, with the image transmission/reception system 10 shown in FIG. 1, when the first transport stream TS1 including stereoscopic (3D) image data is transmitted, the receiver 200 is in a reception state of the stereoscopic (3D) image data. At the graphics generating unit 219 of the receiver 200, the superimposed position of graphics information to be superimposed on the image of each view is adjusted, and disparity is given to each, based on the disparity information obtained at the disparity information decoder 220. Accordingly, with display of the graphics information, perspective consistency between objects within an image can be maintained in the optimal state.

2. Modification

Note that, with the above-mentioned embodiment, an example has been shown wherein association between the first video elementary stream and a predetermined number of second video elementary streams is performed using single stream association information. For example, this single stream association information is included in the stream association data "Stream_Association data" with a structural example being shown in FIG. 5 or FIG. 7. Also, for example, this single stream association information is included in the stream association descriptor "Stream_Association_descriptor" with a structural example being shown in FIG. 9 or FIG. 11.

In the event of employing the single stream association information in this way, for example, when the stream association information is inserted into a region having less capacity such as a private data region of a PES packet, or the like, the following inconvenience occurs. Specifically, the number of second video elementary streams to be associated with the first video elementary stream is restricted to less.

However, a case can also be assumed wherein the number of second video elementary streams to be associated with the first video elementary stream is great. Accordingly, it can also be conceived that association between the first video elementary stream and a predetermined number of second video elementary streams is performed using M (M is an integer of two or more) pieces of stream association information. In this case, the M pieces of stream association information are arranged to associate between the first video elementary stream, and the second video elementary stream within each set obtained by dividing a predetermined number of second video elementary streams into M sets.

The M pieces of stream association information are employed in this way, whereby a great number of second video elementary streams can be associated with the first video elementary stream, for example, even when inserting stream association information into a region having less capacity such as a private data region of a PES packet, or the like.

FIG. 22 illustrates a structural example of each stream association data "Stream_Association data" to be inserted into a private region of a PES packet in the event of employing the M pieces of stream association information. FIG. 23 illustrates the contents of each information in the structure shown in FIG. 22. The data structural example in FIG. 22 is an example wherein association is performed using packet identifiers (PID). "Stream_association tag" is 8-bit data indicating a data type, and here indicates that the data is the stream association data. "Stream_Association_data_length" is 8-bit data indicating the length (size) of data. This data indicates the number of bytes of "Stream_Association_data_length" and thereafter as the length of data.

"stream_association_number_minus" is 3-bit data indicating the number of stream association data. When the number of stream association data is M, the value of (M−1) is set. "stream_count_for_association" is, with this stream association data, 4-bit data indicating the number of non-base views to be associated with the base view, and takes a value of 0 through 15. In the case of a stereo stereoscopic image, "stream_count_for_association=1" is set.

"stream_association_id" is 3-bit data serving as identification information for identifying this stream association data, i.e., itself. For example, let us consider a case where two pieces of stream association data in total are employed for associating the video elementary streams of the base view and a predetermined number of non-base views. In this case, for example, with the first stream association data, "stream_association_id=0" is set, and with the second stream association data, "stream_association_id=1" is set.

"Elementary_PID_of_minimum_view_id" is 13-bit data indicating the packet identifier "PID" of the video elementary stream of the base view. There are the same number of "Associated_stream_Elementary_PID" as the number that "stream_count_for_association" indicates, as to "Elementary_PID_of_minimum_view_id". This "Associated_stream_Elementary_PID" is 13-bit data indicating the packet identifier "PID" of the video elementary stream of a non-base view associated with the video elementary stream of the base view.

FIG. 24 illustrates another structural example of the stream association data. FIG. 23 also illustrates the contents of each information in the structure shown in FIG. 24. The data structural example in FIG. 24 is an example wherein association is performed using component tags (Component_tag). "Component_tag_minimum_view_id" is data disposed instead of "Elementary_PID_of_minimum_view_id" in the data structural example in FIG. 22. This data is 8-bit data indicating the component tag (Component_tag) of the video elementary stream of the base view.

There are the same number of "Component_tag_Associated_stream" as the number that "stream_count_for_association" indicates, as to "Component_tag_minimum_view_id". This "Component_tag_Associated_stream" is 8-bit data indicating the component tag (Component_tag) of the video elementary stream of a non-base view associated with the video elementary stream of the base view. In this way, with the data structural example in FIG. 24, the stream association information is information for associating the component tags (Component_tag) of the video elementary streams of the base view and a predetermined number of non-base views.

Note that, though the detailed description will be omitted, the stream association descriptor "Stream_Association_descriptor" to be inserted under an EIT or the like can also be structured in the same way as the stream association data shown in FIG. 22 or FIG. 24.

Note that, with the above-mentioned embodiment, the image data of the base view included in the first video elementary stream, and the image data of a non-base view included in the second video elementary stream have been subjected to encoding of MPEG4-AVC. However, encoding to be performed on each image data is not restricted to MPEG4-AVC, and another encoding format may be employed. Also, the encoding format to which each image data is to be subjected to does not have to be the same, and may differ.

Figure 25:
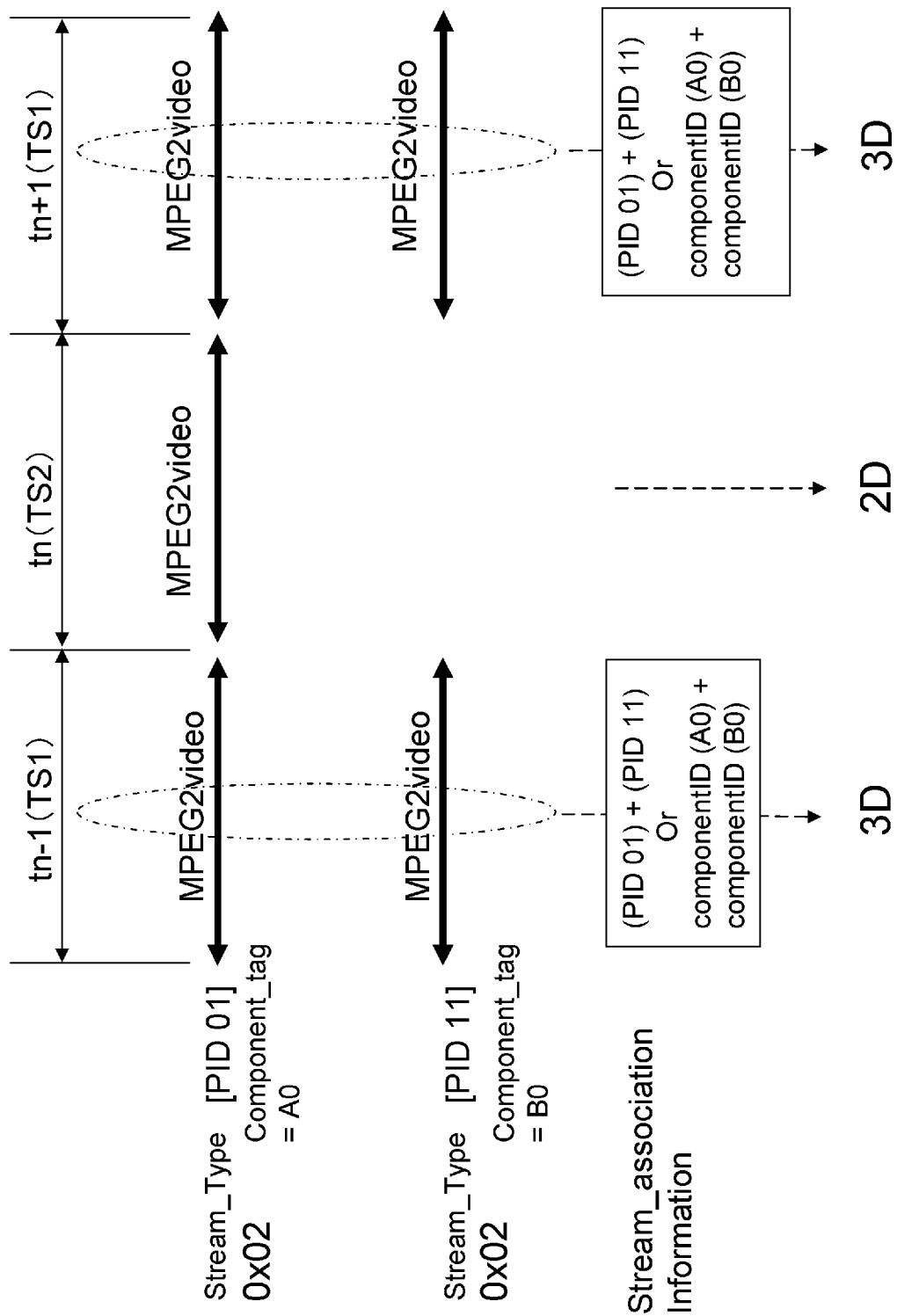
FIG. 25 is a diagram illustrating a transmission example of a transport stream (the encoding formats of the image data of the elementary streams to be associated by the stream association information SAI are the same).

FIG. 25 illustrates a transmission example of the transport streams wherein the first transport stream TS1 and the second transport stream TS2 are alternately transmitted. With this transmission example, the image data encoding formats of the elementary streams to be associated by stream association information SAI, included in the first transport stream TS1, are the same.

The first transport stream TS1 includes two video elementary streams of the base view and a non-base view. Each of the video elementary streams includes the image data of each view subjected to encoding of MPEG2 video, and the stream type (Stream_Type) is "0x02".

Also, the first transport stream TS1 includes stream association information SAI (Stream_Association Information). According to this stream association information SAI, two video elementary streams of the base view and a non-base view are associated by packet identifiers (PID) or component tags (Component_tag).

The second transport stream TS2 includes the video elementary stream of two-dimensional (2D) image data. This video elementary stream includes two-dimensional (2D) image data subjected to encoding of MPEG2 video in the same way as the above-mentioned video elementary stream of the base view, and the stream type (Stream_Type) is "0x02". This second transport stream TS2 includes no stream association information SAI.

Figure 26:
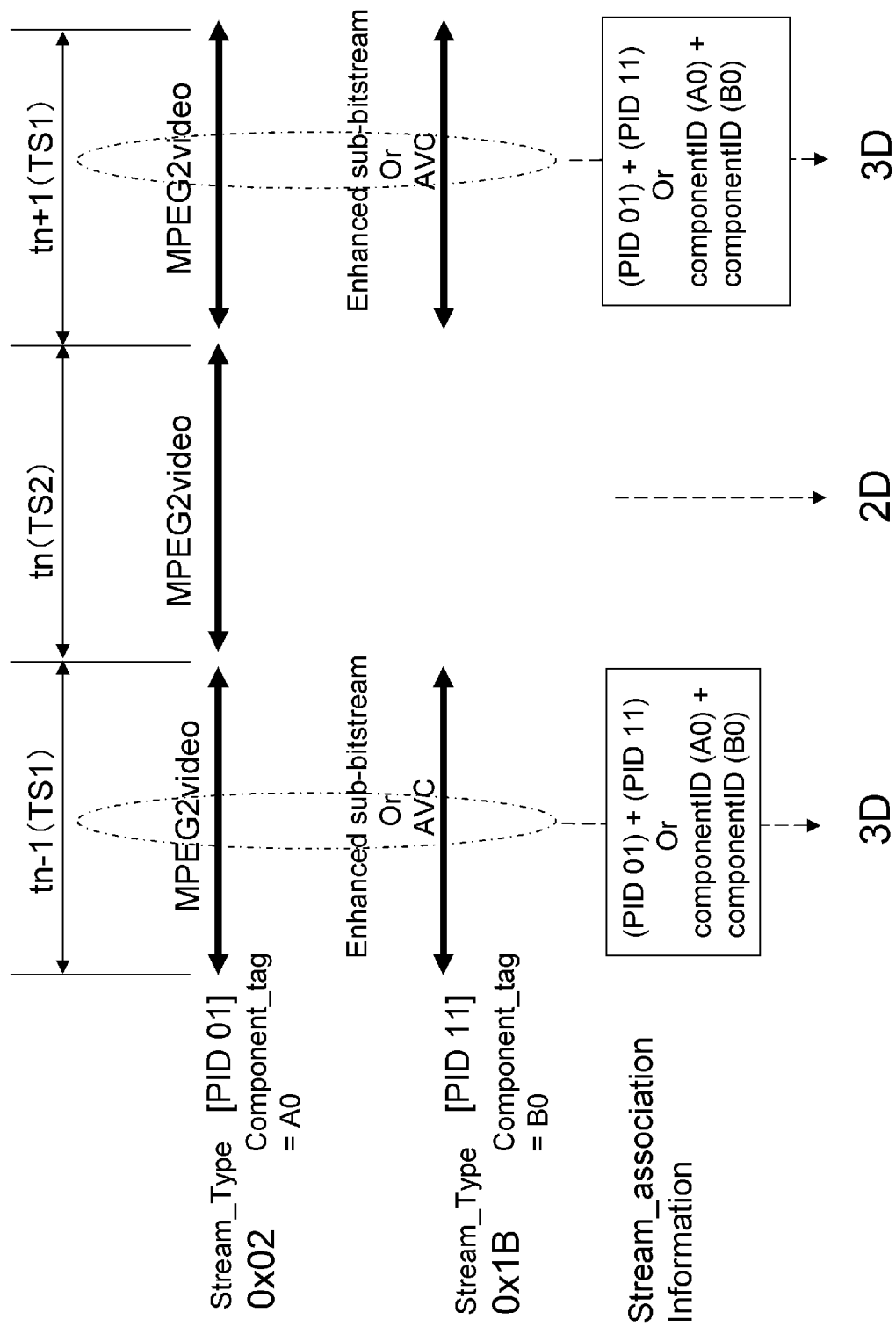
FIG. 26 is a diagram illustrating a transmission example of a transport stream (the encoding formats of the image data of the elementary streams to be associated by the stream association information SAI differ).

FIG. 26 illustrates another transmission example of the transport streams wherein the first transport stream TS1 and the second transport stream TS2 are alternately transmitted. With this transmission example, the image data encoding formats of the elementary streams to be associated by stream association information SAI, included in the first transport stream TS1, differ.

The first transport stream TS1 includes two video elementary streams of the base view and a non-base view. The video elementary stream of the base view includes the image data of the base view subjected to encoding of MPEG2 video, and the stream type (Stream_Type) is "0x02". Also, the video elementary stream of a non-base view includes the image data of the non-base view subjected to encoding of MPEG4-AVC, and the stream type (Stream_Type) is "0x1B".

Also, the first transport stream TS1 includes stream association information SAI (Stream_Association Information). According to this stream association information SAI, the two video elementary streams of the base view and a non-base view are associated by packet identifiers (PID) or component tags (Component_tag).

The second transport stream TS2 includes the video elementary stream of two-dimensional (2D) image data. This video elementary stream includes two-dimensional (2D) image data subjected to encoding of MPEG2 video in the same way as the above-mentioned video elementary stream of the base view, and the stream type (Stream_Type) is "0x02". This second transport stream TS2 includes no stream association information SAI.

Figure 27:
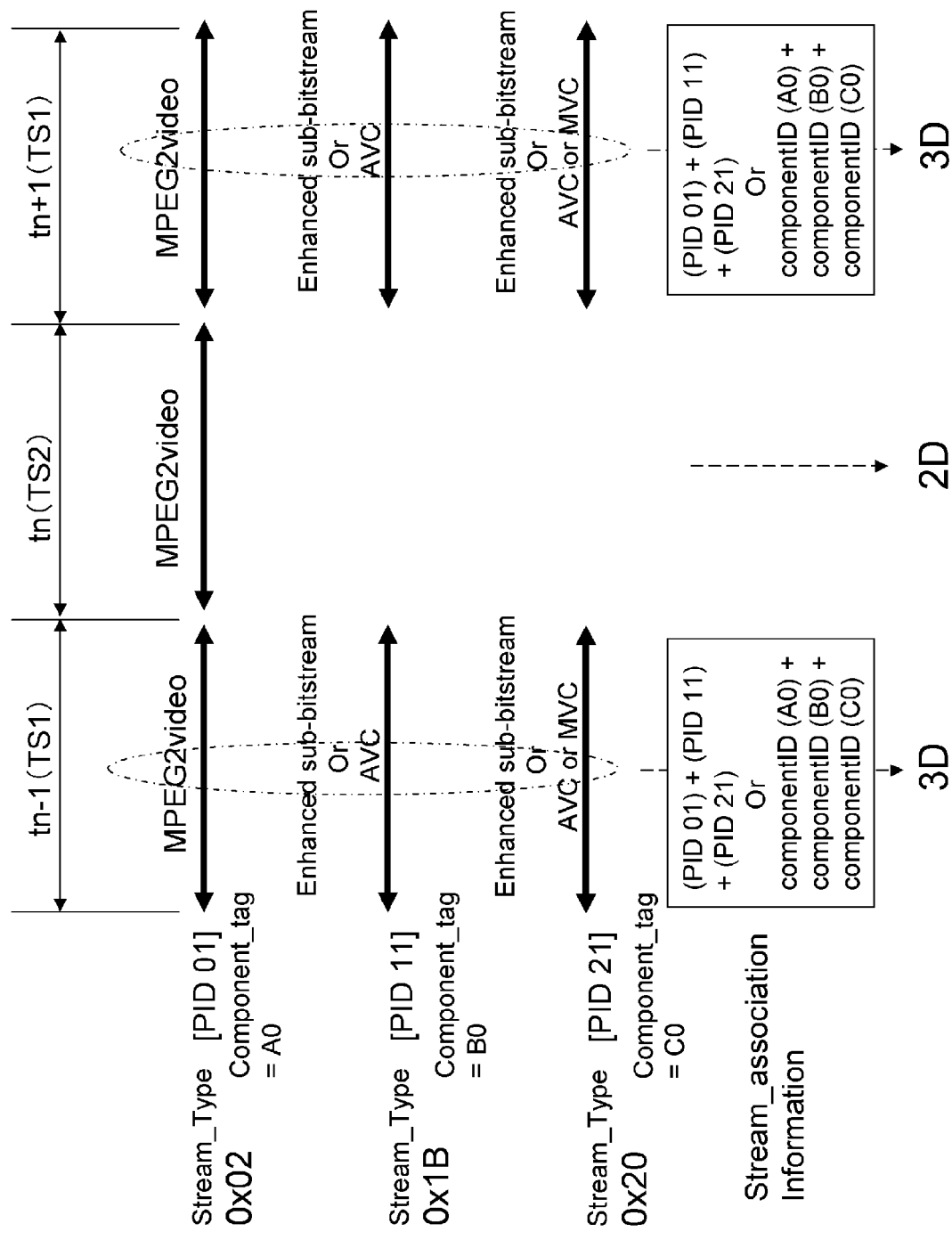
FIG. 27 is a diagram illustrating a transmission example of a transport stream (the encoding formats of the image data of the elementary streams to be associated by the stream association information SAI differ).

FIG. 27 illustrates yet another transmission example of the transport streams wherein the first transport stream TS1 and the second transport stream TS2 are alternately transmitted. With this transmission example, the image data encoding formats of the elementary streams to be associated by stream association information SAI, included in the first transport stream TS1, differ.

The first transport stream TS1 includes two video elementary streams of the base view and a non-base view. The video elementary stream of the base view includes the image data of the base view subjected to encoding of MPEG2 video, and the stream type (Stream_Type) is "0x02". Also, the video elementary stream of the first non-base view includes the image data of the non-base view subjected to encoding of MPEG4-AVC, and the stream type (Stream_Type) is "0x1B". Further, the video elementary stream of the second non-base view includes the image data of the non-base view subjected to encoding of MPEG4-AVC, and the stream type (Stream_Type) is "0x20".

Also, the first transport stream TS1 includes stream association information SAI (Stream_Association Information). According to this stream association information SAI, the three video elementary streams of the base view and non-base views are associated by packet identifiers (PID) or component tags (Component_tag).

The second transport stream TS2 includes the video elementary stream of two-dimensional (2D) image data. This video elementary stream includes two-dimensional (2D) image data subjected to encoding of MPEG2 video in the same way as the above-mentioned video elementary stream of the base view, and the stream type (Stream_Type) is "0x02". This second transport stream TS2 includes no stream association information SAI.

Even with transmission examples of the transport streams such as shown in FIG. 25, FIG. 26, or FIG. 27, the receiver 200 can adequately handle dynamic change of the first transport stream TS1, and the second transport stream TS2, i.e., dynamic change in the contents of distribution, and perform correct stream reception.

Specifically, during the period of tn−1, the first transport stream TS1 is transmitted. This first transport stream TS1 includes stream association information SAI (Stream_Association Information), and the two or three video elementary streams are associated by packet identifiers (PID) or component tags (Component_tag).

Accordingly, the receiver 200 can readily recognize that the first transport stream TS1 has been transmitted. Also, the receiver 200 can readily recognize the video elementary stream of a non-base view associated with the video elementary stream of the base view. The receiver 200 is in a reception state of stereoscopic (3D) image data during the period of tn−1. Accordingly, the receiver 200 can correctly perform reception of the first transport stream TS1, obtain the image data of the base view and a non-base view making up stereoscopic (3D) image data, and display these by taking output synchronization.

Also, during a period of tn following the period of tn−1, the second transport stream TS2 is transmitted. This second transport stream TS2 includes no stream association information SAI. Accordingly, the receiver 200 can readily recognize that the second transport stream TS2 has been transmitted, and is in a reception state of two-dimensional (2D) image data during the period of tn−1. Accordingly, the receiver 200 can correctly perform reception of the second transport stream TS2, and obtain two-dimensional (2D) image data.

Further, during a period of tn+1 following the period of tn, the first transport stream TS1 is transmitted. During the period of tn+1, in the same way as the above-mentioned period of tn−1, the receiver 200 can correctly perform reception of the first transport stream TS1 based on the stream association information SAI, obtain the image data of the base view and a non-base view making up stereoscopic (3D) image data, and display these by taking output synchronization.

Also, the above-mentioned embodiment is based on the premise that the resolution of the imaged data of the base view included in the first video elementary stream, and the resolution of the image data of a non-base view included in the second video elementary stream are the same. However, the resolution of each image data may not be the same. An example of this is that the resolution of the image data of the base view is 1920×1080, the resolution of the image data of a non-base view is 1280×720 or another resolution.

Figure 28:
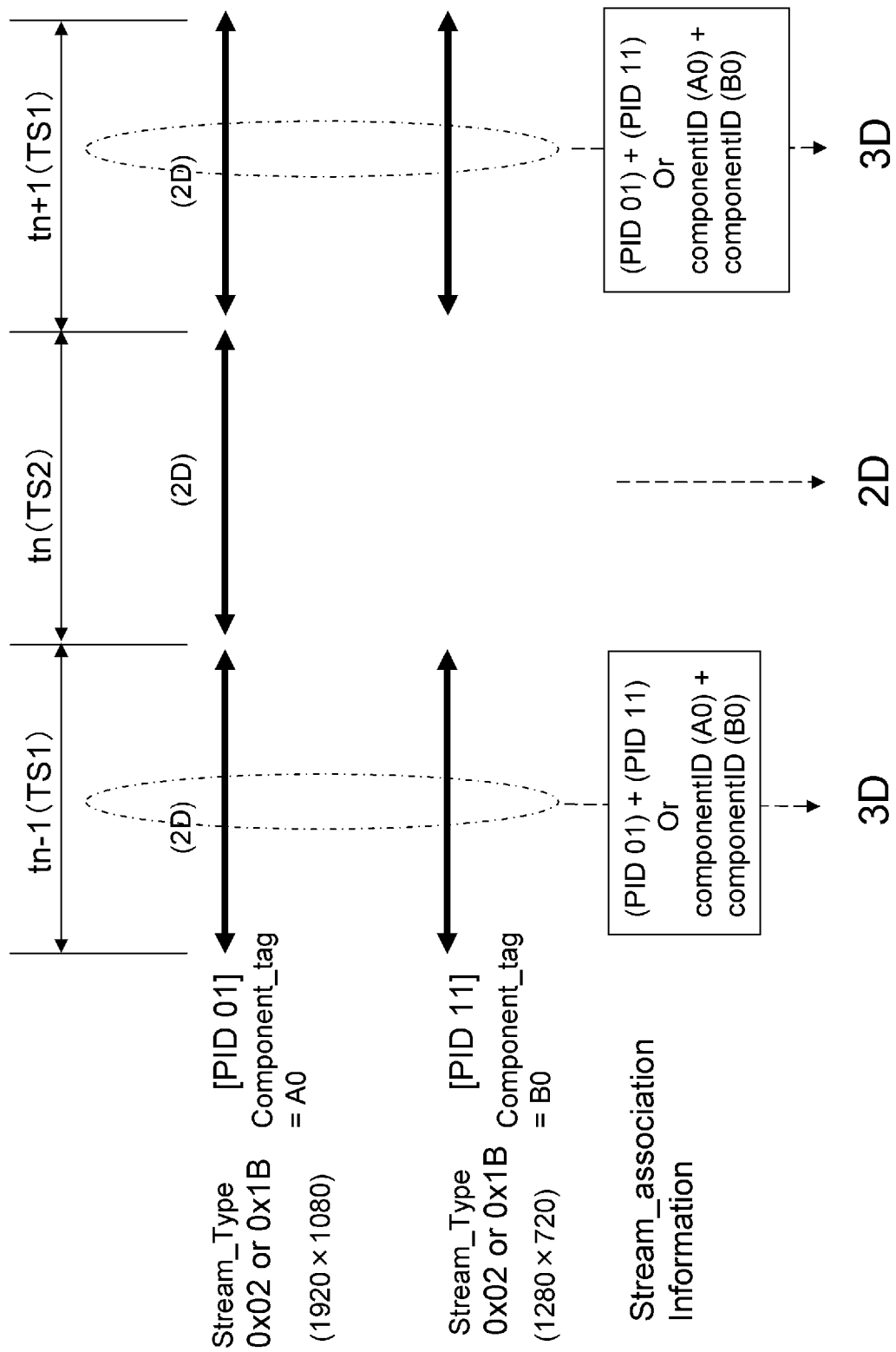
FIG. 28 is a diagram illustrating a transmission example of a transport stream (the resolutions of the image data of the elementary streams to be associated by the stream association information SAI differ).

FIG. 28 illustrates a transmission example of the transport streams wherein the first transport stream TS1 and the second transport stream TS2 are alternately transmitted. With this transmission example, the resolutions of the image data of the elementary streams to be associated by the stream association information SAI, included in the first transport stream TS1, differ.

The first transport stream TS1 includes two video elementary streams of the base view and a non-base view. The video elementary stream of the base view includes, for example, the image data of resolution of 1920×1080, and the stream type (Stream_Type) is "0x02" or "0x1B". Also, the video elementary stream of a non-base view includes, for example, the image data of resolution of 1280×720, and the stream type (Stream_Type) is "0x02" or "0x1B".

Also, the first transport stream TS1 includes stream association information SAI (Stream_Association Information). According to this stream association information SAI, the two video elementary streams of the base view and a non-base view are associated by packet identifiers (PID) or component tags (Component_tag).

The second transport stream TS2 includes the video elementary stream of two-dimensional (2D) image data. This video elementary stream includes, for example, the image data of resolution of 1920×1080, in the same way as with the above-mentioned video elementary stream of the base view, and the stream type (Stream_Type) is "0x02" or "0x1B". This second transport stream TS2 includes no stream association information SAI.

Even with a transmission example of the transport streams such as shown in FIG. 28, the reception side can adequately handle dynamic change of the first transport stream TS1 and the second transport stream TS2, i.e., dynamic change in the contents of distribution, and perform correct stream reception.

Specifically, during the period of tn−1, the first transport stream TS1 is transmitted. This first transport stream TS1 includes stream association information SAI (Stream_Association Information), and the two video elementary streams are associated by packet identifiers (PID) or component tags (Component_tag).

Accordingly, the reception side can readily recognize that the first transport stream TS1 has been transmitted. Also, the reception side can readily recognize the video elementary stream of a non-base view associated with the video elementary stream of the base view. The reception side is in a reception state of stereoscopic (3D) image data during the period of tn−1. Accordingly, the reception side can correctly perform reception of the first transport stream TS1, and obtain the image data of the base view and a non-base view making up stereoscopic (3D) image data.

Also, during a period of to following the period of tn−1, the second transport stream TS2 is transmitted. This second transport stream TS2 includes no stream association information SAI. Accordingly, the reception side can readily recognize that the second transport stream TS2 has been transmitted, and is in a reception state of two-dimensional (2D) image data during the period of tn−1. Accordingly, the reception side can correctly perform reception of the second transport stream TS2, and obtain two-dimensional (2D) image data.

Further, during a period of tn+1 following the period of tn, the first transport stream TS1 is transmitted. During the period of tn+1, in the same way as the above-mentioned period of tn−1, the reception side can correctly perform reception of the first transport stream TS1 based on the stream association information SAI, and obtain stereoscopic (3D) image data.

Here, the stereoscopic (3D) image data obtained at the reception side is made up of the image data of the base view and a non-base view of which the resolutions differ. At the reception side, for example, resolution adjustment processing for equalizing the output resolution of each image data may be performed. In this case, the output resolution is adjusted to, for example, the resolution of the image data of the base view, or the resolution that has been set at the reception side beforehand. Also, in this case, as will be described later, when the stream association information SAI includes the control information of the output resolution, the output resolution is adjusted to the resolution of the image data of a predetermined video elementary stream, for example.

Figure 29:
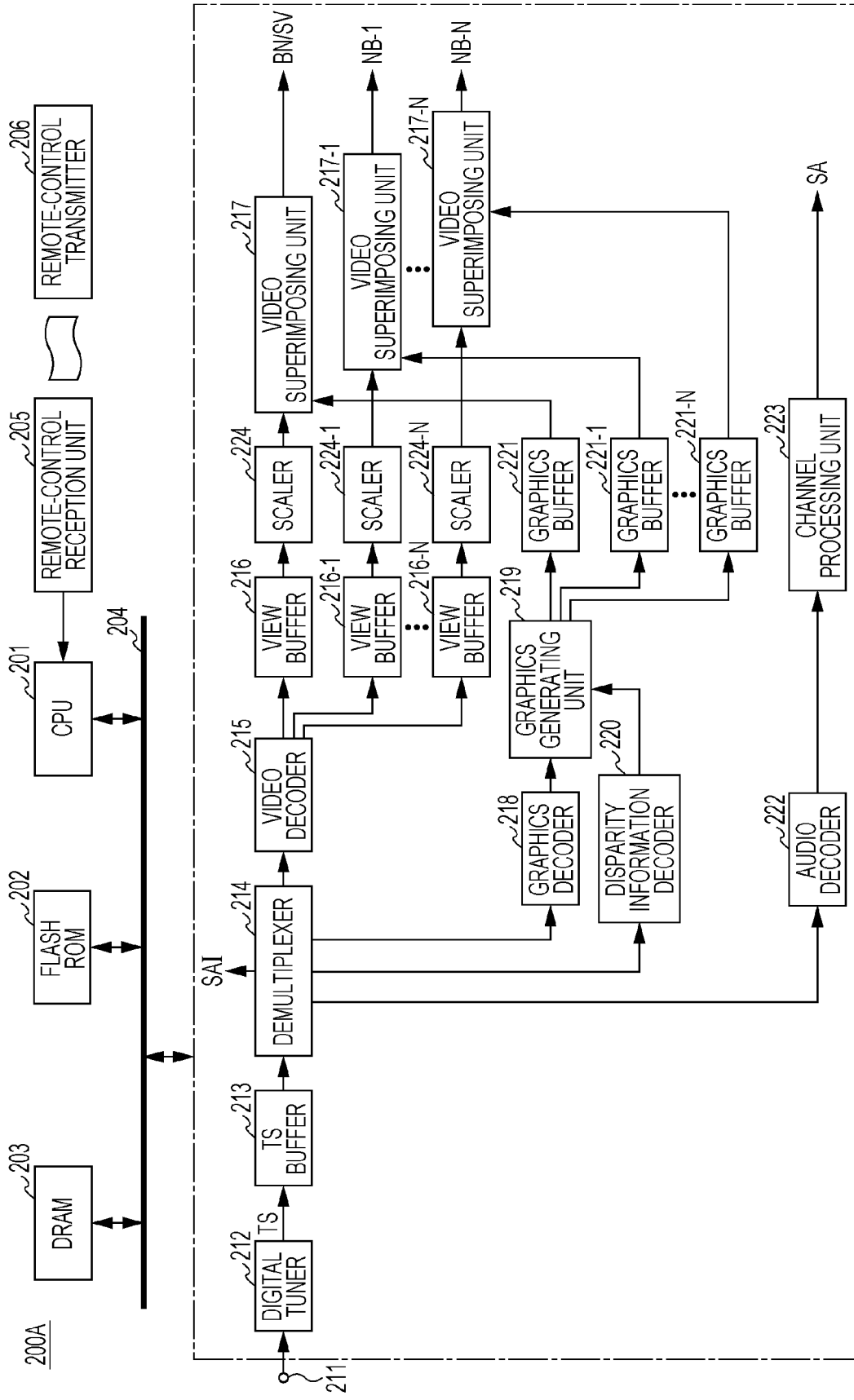
FIG. 29 is a block diagram illustrating a configuration example of a receiver (including a resolution adjustment unit) making up the image transmission/reception system.

FIG. 29 illustrates a configuration example of a receiver 200A including a resolution adjustment unit. In this FIG. 29, portions corresponding to FIG. 15 are denoted with the same reference numerals, and detailed description thereof will be omitted. This receiver 200A includes a CPU 201, flash ROM 202, DRAM 203, an internal bus 204, a remote-control reception unit 205, and a remote-control transmitter 206. Also, this receiver 200 includes an antenna terminal 211, a digital tuner 212, a transport stream buffer (TS buffer) 213, and a demultiplexer 214.

Also, the receiver 200A includes a video decoder 215, view buffers 216, and 216-1 through 216-N, scalars 224, and 224-1 through 224-N, video superimposing units 217, and 217-1 through 217-N. Further, the receiver 200 includes a graphics decoder 218, a graphics generating unit 219, a disparity information decoder 220, graphics buffers 221, 221-1 through 221-N, an audio decoder 222, and a channel processing unit 223.

The scalars 224, and 224-1 through 224-N performs adjustment under the control of the CPU 201 so that the output resolution of the image data of each view output from the view buffers 216, and 216-1 through 216-N becomes a predetermined resolution. The scalars 224, and 224-1 through 224-N make up a resolution adjustment unit. The image data of each view subjected to resolution adjustment is transmitted to the video superimposing units 217, and 217-1 through 217-N.

In this case, the CPU 201 obtains the resolution information of the image data of each view from the video decoder 215. The CPU 201 executes filter settings of the scalars 224, and 224-1 through 224-N based on the resolution information of each view so that the output resolution of the image data of each view becomes a target resolution. With the scalars 224, and 224-1 through 224-N, when the resolution of input image data differs from the target resolution, resolution conversion is performed by interpolation processing, and the output image data with the target resolution is obtained.

The others in the receiver 200A shown in FIG. 29 are configured in the same way as the receiver 200 shown in FIG. 15 and operate in the same way though detailed description will be omitted.

Also, with the above-mentioned embodiment, the video elementary streams of the base view and a predetermined number of non-base views have been associated by stream association information SAI. However, it can also be conceived that meta data relating to the image data of the base view is also associated by this stream association information SAI, for example. For example, disparity information (disparity vector or depth data) or the like can be conceived as meta data.

Figure 30:
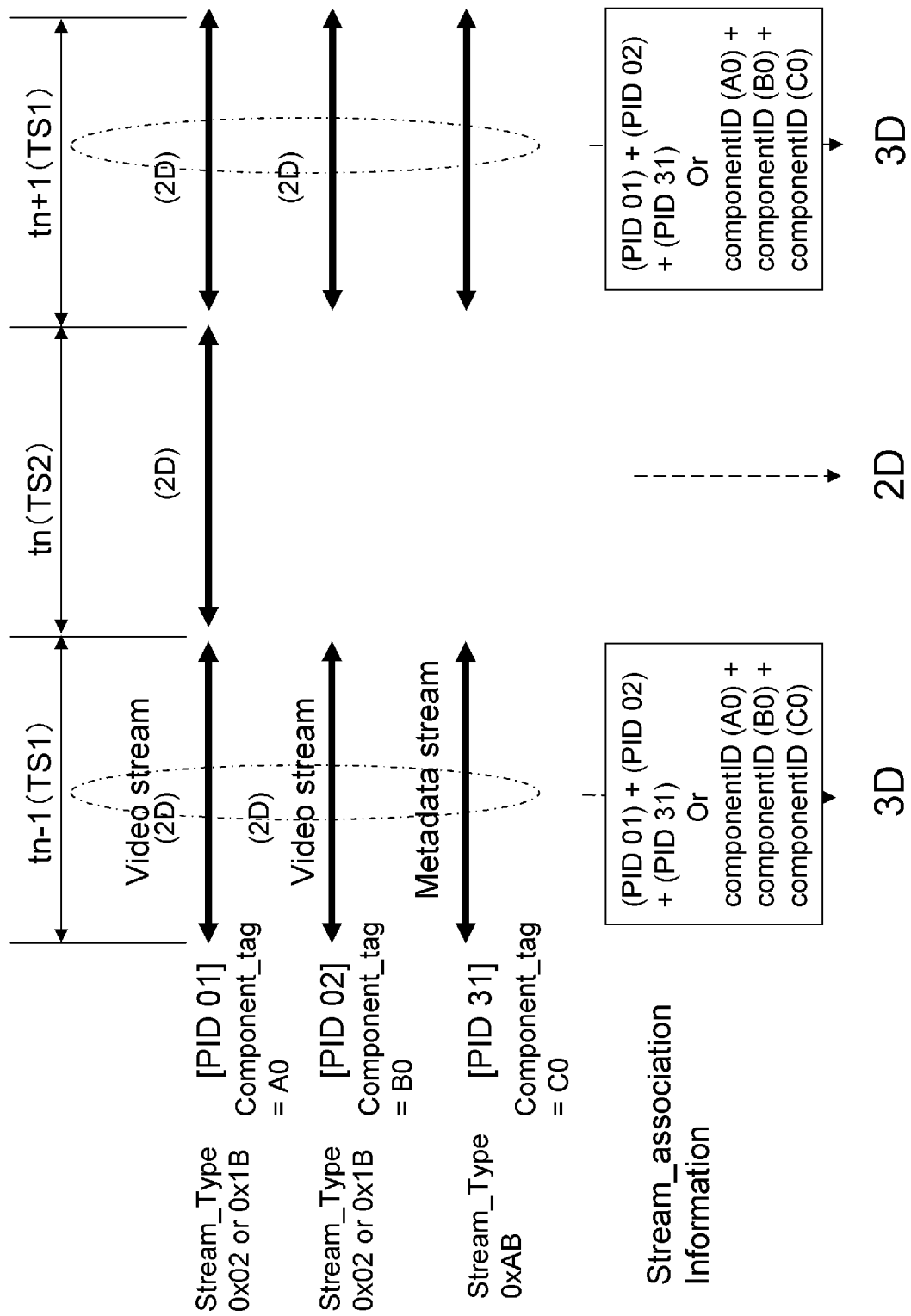
FIG. 30 is a diagram illustrating a transmission example of a transport stream (the elementary stream of meta data is included in the elementary streams to be associated by the stream association information SAI).

FIG. 30 illustrates a transmission example of the transport streams wherein the first transport stream TS1 and the second transport stream TS2 are alternately transmitted. With this transmission example, two video elementary streams of the base view and a non-base view, and the disparity information elementary stream are included in the first transport stream TS1.

The video elementary stream of the base view includes, for example, the image data of the base view, and the stream type (Stream_Type) is "0x02" or "0x1B". Also, the video elementary stream of a non-base view includes the image data of a non-base view, and the stream type (Stream_Type) is "0x02" or "0x1B". Further, the disparity information elementary stream includes, for example, disparity information for each pixel (pixel), and the stream type (Stream_Type) is "0xAB".

Also, the first transport stream TS1 includes stream association information SAI (Stream_Association Information). According to this stream association information SAI, two video elementary streams of the base view and a non-base view, and also the disparity information elementary stream are associated by packet identifiers (PID) or component tags (Component_tag).

The second transport stream TS2 includes the video elementary stream of two-dimensional (2D) image data. This video elementary stream include, in the same way as the above-described video elementary stream of the base view, two-dimensional (2D) image data, and the stream type (Stream_Type) is "0x02" or "0x1B". This second transport stream TS2 includes no stream association information SAI.

Even with a transmission example of the transport streams such as shown in FIG. 30, the reception side can adequately handle dynamic change of the first transport stream TS1 and the second transport stream TS2, i.e., dynamic change in the contents of distribution, and perform correct stream reception.

Specifically, during the period of tn−1, the first transport stream TS1 is transmitted. This first transport stream TS1 includes stream association information SAI (Stream_Association Information), and the two video elementary streams and one disparity information elementary stream are associated by packet identifiers (PID) or component tags (Component_tag).

Accordingly, the reception side can readily recognize that the first transport stream TS1 has been transmitted. Also, the reception side can readily recognize the video elementary stream of a non-base view associated with the video elementary stream of the base view, and further a disparity information elementary stream. The reception side is in a reception state of stereoscopic (3D) image data during the period of tn−1. Accordingly, the reception side can correctly perform reception of the first transport stream TS1, and obtain the image data of the base view and a non-base view making up stereoscopic (3D) image data, and disparity information for each pixel (pixel) corresponding to this stereoscopic image data.

Also, during a period of tn following the period of tn−1, the second transport stream TS2 is transmitted. This second transport stream TS2 includes no stream association information SAI. Accordingly, the reception side can readily recognize that the second transport stream TS2 has been transmitted, and is in a reception state of two-dimensional (2D) image data during the period of tn−1. Accordingly, the reception side can correctly perform reception of the second transport stream TS2, and obtain two-dimensional (2D) image data.

Further, during a period of tn+1 following the period of tn, the first transport stream TS1 is transmitted. During the period of tn+1, in the same way as the above-mentioned period of tn−1, the reception side can correctly perform reception of the first transport stream TS1 based on the stream association information SAI, and obtain stereoscopic (3D) image data and disparity information corresponding thereto.

Here, the reception side can subject the image data of the base view and a non-base view to interpolation processing (post-processing) based on the disparity information (disparity information for each pixel) corresponding to stereoscopic (3D) image data to obtain the display image data of a predetermined number of views.

Figure 31:
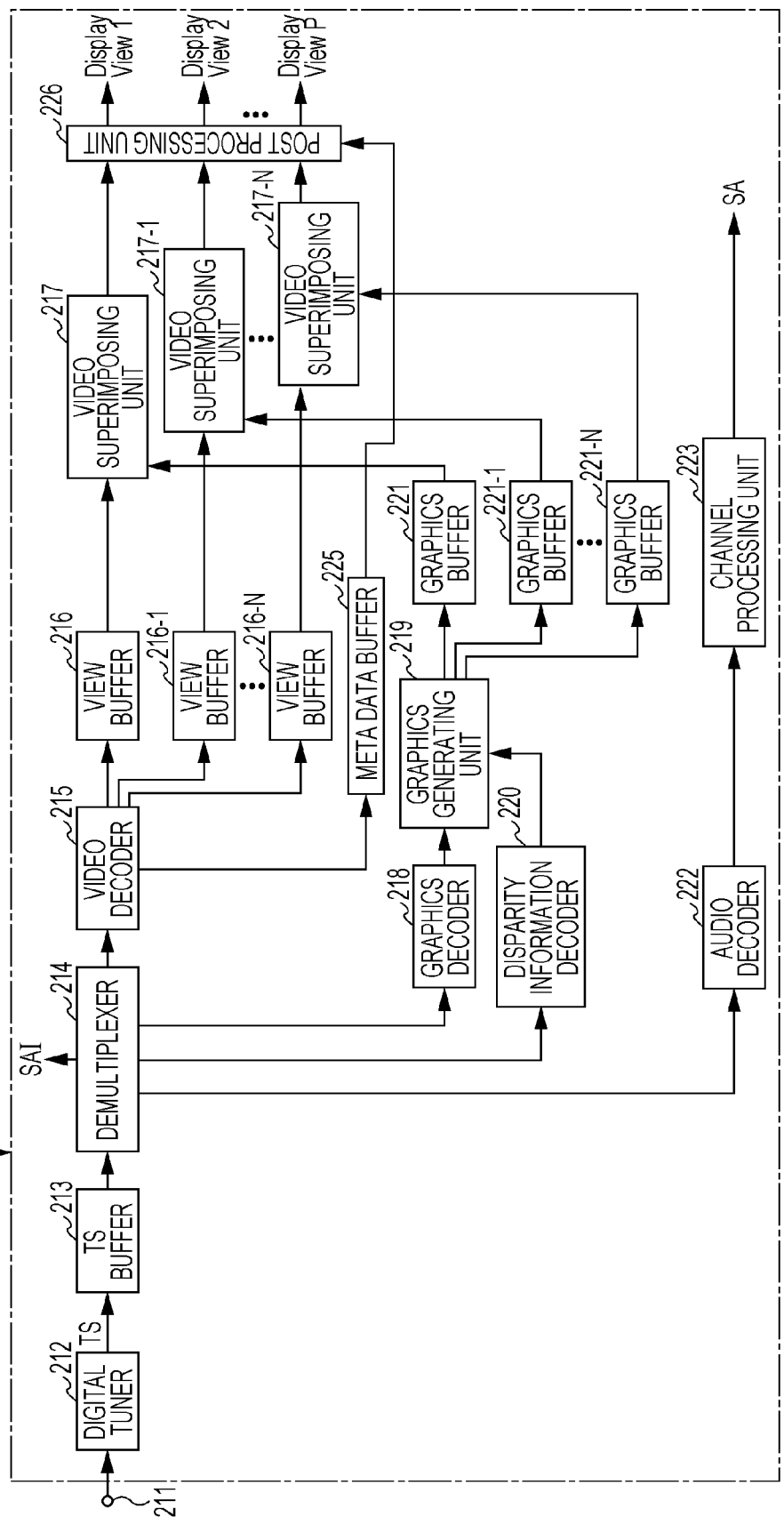
FIG. 31 is a block diagram illustrating a configuration example of a receiver (including a post-processing unit) making up the image transmission/reception system.

FIG. 31 illustrates a configuration example of a receiver 200B including a post-processing unit. In this FIG. 31, portions corresponding to FIG. 15 are denoted with the same reference numerals, and detailed description thereof will be omitted. This receiver 200B includes a CPU 201, flash ROM 202, DRAM 203, an internal bus 204, a remote-control reception unit 205, and a remote-control transmitter 206. Also, this receiver 200 includes an antenna terminal 211, a digital tuner 212, a transport stream buffer (TS buffer) 213, and a demultiplexer 214.

Also, the receiver 200A includes a video decoder 215, view buffers 216, and 216-1 through 216-N, video superimposing units 217, and 217-1 through 217-N, a meta data buffer 225, and a post-processing unit 226. Further, the receiver 200 includes a graphics decoder 218, a graphics generating unit 219, a disparity information decoder 220, graphics buffers 221, 221-1 through 221-N, an audio decoder 222, and a channel processing unit 223.

The meta data buffer 225 temporarily accumulate disparity information for each pixel (pixel) obtained at the video decoder 215. Note that, in the event that the disparity information is disparity information for each pixel (pixel), this disparity information can be handled like pixel data. In the event that the disparity information for each pixel (pixel) is obtained at the video decoder 215, the transmission side subjects the disparity information to encoding using the same encoding format as with the image data to generate a disparity information elementary stream.

The post-processing unit 226 subjects the image data of each view output from the view buffers 216, and 216-1 through 216-N to interpolation processing (post-processing) using the disparity information for each pixel (pixel) accumulated in the meta data buffer 225 to obtain the display image data Display View 1 through Display View P of a predetermined number of views.

The others in the receiver 200B shown in FIG. 31 are configured and operate in the same way as with the receiver 200 shown in FIG. 15 though detailed description will be omitted.

Also, the stream association information SAI according to the above-mentioned embodiment includes information for associating the elementary streams of the base view and a non-base view (packet identifier information, component tag information). However, it can be conceived that this stream association information SAI further includes other information. For example, it can be conceived that this stream association information SAI includes the control information of the output resolution of the image data of the base view and a non-base view. Also, for example, it can be conceived that the stream association information SAI includes control information for specifying whether or not the image data of a predetermined number of non-base views has to be displayed.

FIG. 32 illustrates a structural example of each stream association data "Stream_Association data" to be inserted into the private region of a PES packet in the event of employing M pieces of stream association information. FIG. 33 and FIG. 34 illustrate the contents of each information in the structure shown in FIG. 32. The data structural example in FIG. 32 is an example for performing association using packet identifiers (PID).

"Stream_association_tag" is 8-bit data indicating a data type, and here indicates that the data type is stream association data. "Stream_association_data_length" is 8-bit data indicating the length (size) of data. This data indicates the number of bytes of "Stream_association_data_length" and thereafter as the length of data. "stream_association_number" is 4-bit data indicating the number of stream association data, and takes a value of 0 through 15. When the number of stream association data is M, a value of (M−1) is set.

"stream_association_id" is 4-bit data serving as identification information for identifying this stream association data, i.e., itself. For example, let us consider a case where two pieces of stream association data in total are used for associating the video elementary streams of the base view and a predetermined number of non-base views. In this case, for example, with the first stream association data, "stream_association_id=0" is set, and with the second stream association data, "stream_association_id=1" is set.

"stream_count_for_association" is, with this stream association data, 4-bit data indicating the number of non-base views to be associated with the base view, and takes a value of 0 through 15. In the case of a stereo stereoscopic image, "stream_count_for_association=1" is set.

"indication_of_resolution_master" is 1-bit flag information. This flag information indicates, with this stream association data, whether or not there is the video elementary stream of a non-base view to be served as the master (primary master) of the video elementary streams of a predetermined number of non-base views associated with the base view in respect of an output resolution. "1" indicates that there is the master of the video elementary streams of non-base views. "0" indicates that the video elementary stream of the base view is the master, and the reception (decoder) side takes the resolution of image data included in the video elementary stream of this base view as the target of the output resolution of the image data of each view.

"Elementary_PID_of_minimum_view_id" is 13-bit data indicating the packet identifier "PID" of the video elementary stream of the base view. There are the same number of "Associated_stream_Elementary_PID" as the number that "stream_count_for_association" indicates as to this "Elementary_PID_of_minimum_view_id". This "Associated_stream_Elementary_PID" is 13-bit data indicating the packet identifier "PID" of the video elementary stream of a non-base view associated with the video elementary stream of the base view.

"indication_of_selected_stream_display" is 1-bit flag information. This flag information indicates, with this stream association data, of the video elementary streams of the base view itself and a predetermined number of non-base views associated therewith, the video elementary stream of a non-base view that has to be decoded and displayed. "1" indicates which of the video elementary stream of the base view, and the video elementary stream of a non-base view has to be displayed, and "0" indicates that all of the video elementary stream of the base view, and the video elementary stream of a non-base view have to be displayed. In the case of "1", the video elementary stream of a non-base view set to display_mandatory_flag has to be displayed along with the video elementary stream of the base view. [0]

Also, there are the same number of "display_mandatory_flag" and "resolution_master_flag" as the number "stream_count_for_association" indicates as to "Elementary_PID_of_minimum_view_id". "display_mandatory_flag" is 1-bit flag information. This "display_mandatory_flag" indicates whether or not the video elementary stream (image data) of this non-base view has to be displayed. "1" indicates that display has to be performed (mandatory), and "0" indicates that display does not have to be performed. This "display_mandatory_flag" makes up control information for specifying whether or not display has to be performed as to the image data of each non-base view.

For example, let us consider a case where the video elementary stream of a non-base view including the image data of the right eye is associated with the video elementary stream of the base view including the image data of the left eye. In this case, when "indication_of_selected_stream_display" is "0", the reception (decoder) side outputs both of the image data of the right eye, and the image data of the left eye as display image data. On the other hand, when "indication_of_selected_stream_display" is "1", and also "display_mandatory_flag" of a non-base view is "0", the non-base view does not have to be displayed, and accordingly, the reception (decoder) side outputs only either the image data of the left eye or the image data of the right eye, or both of the image data of the left eye, and the image data of the right eye as display image data. [0]

"resolution_master_flag" is 1-bit flag information. This "resolution_master_flag" indicates whether or not the video elementary stream of this non-base view is the master (primary master) in respect of an output resolution. "1" indicates that the video elementary stream of this non-base view is the master, and "0" indicates that the video elementary stream of this non-base view is not the master. When "resolution_master_flag" is "1", and the video elementary stream of this non-base view is the master, the reception (decoder) side takes the resolution of image data included in the video elementary stream of this non-base view as the target of the output resolution of the image data of each view. This "resolution_master_flag" makes up the control of the output resolution of the image data of each view along with the above-mentioned "indication_of_resolution_master".

FIG. 35 illustrates another structural example of the stream association data. FIG. 33 and FIG. 34 illustrate the contents of each information in the structure shown in FIG. 35. The structural example in FIG. 35 is an example wherein association is performed using the component tags (Component_tag). "Component_tag_minimum_view_id" is data disposed instead of "Elementary_PID_of_minimum_view_id" in the data structural example in FIG. 32. This data is 8-bit data indicating the component tag (Component_tag) of the video elementary stream of the base view.

There are the same number of "Component_tag_Associated_stream" and so forth as the number "stream_count_for_association" indicates as to "Component_tag_minimum_view_id". This "Component_tag_Associated_stream" is 8-bit data indicating the component tag (Component_tag) of the video elementary stream of a non-base view associated with the video elementary stream of the base view. In this way, with the data structural example in FIG. 35, the stream association information serves as information for associating the component tags (Component_tag) of the video elementary streams of the base view and a predetermined number of non-base views.

Note that, though detailed description will be omitted, the stream association descriptor "Stream_Association_descriptor" to be inserted under an EIT or the like can also be configured in the same way as with the stream association data shown in FIG. 32 or FIG. 35.

Also, with the above-mentioned embodiment, attention is focused on an example wherein the first transport stream TS1 including stereoscopic (3D) image data, and the second transport stream TS2 including two-dimensional (2D) image data are transmitted. However, the present invention can be applied to a case where an AVC stream and an SVC stream are transmitted, in the same way.

An SVC stream includes the video elementary stream of encoded image data of the lowest level making up scalable encoded image data. Further, this SVC stream includes a predetermined number of the video elementary streams of encoded image data of the upper hierarchical level other than the lowest level making up scalable encoded image data. The same information as the above-mentioned stream association information SAI is inserted into this SVC stream, whereby the reception side can adequately handle dynamic change of the AVC stream and SVC stream, i.e., dynamic change in the contents of distribution, and perform correct stream reception.

Also, with the above-mentioned embodiment, an example has been shown wherein the transport stream TS is distributed over broadcast waves, but the present invention can be applied to a case where this transport stream TS is distributed through a network such as the Internet or the like, in the same way. On the other hand, even in the event of Internet distribution with a container file format other than the transport stream TS, the structure of the above-mentioned association data can be applied.

INDUSTRIAL APPLICABILITY

The present invention can be applied to an image data transmission/reception system for performing transmission/reception of transport streams such as MVC, SVC, and so forth including the video elementary streams of a plurality of image data making up stereoscopic image data, scalable encoded image data, or the like.

REFERENCE SIGNS LIST 10 image transmission/reception system
100 broadcasting station
110 transmission data generating unit
111 data fetch unit
111a data recording medium
112 video encoder
113 disparity information encoder
114 audio encoder
115 graphics generating unit
116 graphics encoder
117 multiplexer
200, 200A, 200B receiver
201 CPU
212 digital tuner
213 transport stream buffer (TS buffer)
214 demultiplexer
215 video decoder
216, 216-1 through 216-N view buffer
217, 217-1 through 217-N video superimposing unit
218 graphics decoder
219 graphics generating unit
220 disparity information decoder
221, 221-1 through 221-N graphics buffer
222 audio decoder
223 channel processing unit
224, 224-1 through 224-N scalar
225 meta data buffer
226 post-processing unit

The invention claimed is:

1. An image data transmission device comprising:
a data output unit configured to output first image data, a predetermined number of second image data and/or meta data relating to this first image data; and
a data transmission unit configured to transmit a transport stream;
wherein said transport stream includes the packets obtained by packetizing a first elementary stream including first image data output from said data output unit, and a predetermined number of second elementary streams including a predetermined number of second image data and/or meta data output from said data output unit respectively;
wherein said data transmission unit inserts stream association information for associating said first elementary stream with said predetermined number of second elementary streams into said transport stream;
wherein said data transmission unit inserts M pieces (M is an integer of two or more) said stream association information into said transport stream; and
wherein said M pieces of stream association information associate said first elementary stream with said second elementary stream within each set obtained by dividing said predetermined number of second elementary streams into M sets.

2. The image data transmission device according to claim 1, wherein said stream association information is information for associating the packet identifier of said first elementary stream with the packet identifiers of said predetermined number of second elementary streams.

3. The image data transmission device according to claim 1, wherein said stream association information is information for associating the component tag of said first elementary stream with the component tags of said predetermined number of second elementary streams.

4. The image data transmission device according to claim 1, wherein said data transmission unit inserts said stream association information into a private data region of a packet obtained by packetizing said first elementary stream.

5. The image data transmission device according to claim 1, wherein said transport stream includes an event information table serving as service information for performing management in increments of events; and wherein said data transmission unit inserts said stream association information under said event information table.

6. The image data transmission device according to claim 1, wherein said transport stream includes a program map table serving as program specific information indicating which program each elementary stream included in this transport stream belongs to; and
wherein said data transmission unit inserts said stream association information under said program map table.

7. The image data transmission device according to claim 6, wherein said data transmission unit inserts said stream association information as a program descriptor of said program map table.

8. The image data transmission device according to claim 6, wherein said data transmission unit inserts said stream association information under a video elementary loop of said program map table.

9. The image data transmission device according to claim 1, wherein a combination of optional encoding formats is available as an encoding format of first image data included in said first elementary stream, and an encoding format of second image data included in said predetermined number of second elementary streams.

10. The image data transmission device according to claim 1, wherein said first image data is the image data of a base view making up stereoscopic image data; and
wherein said second image data is the image data of a view other than said base view making up said stereoscopic image data.

11. The image data transmission device according to claim 10, wherein said first image data is the image data of one of the left eye and the right eye for obtaining a stereo stereoscopic image; and
wherein said second image data is the image data of the other of the left eye and the right eye for obtaining said stereo stereoscopic image.

12. The image data transmission device according to claim 10, wherein said meta data is disparity information corresponding to said stereoscopic image data.

13. The image data transmission device according to claim 1, wherein said first image data is encoded image data of the lowest level making up scalable encoded image data; and
wherein said second image data is encoded image data of a hierarchical level other than said lowest level making up said scalable encoded image data.

14. The image data transmission device according to claim 1, wherein said stream association information further includes control information of the output resolutions of said first image data and said second image data.

15. The image data transmission device according to claim 1, wherein said stream association information further includes control information for specifying whether or not display is essential for each of said predetermined number of second image data.

16. An image data transmission method comprising:
a data output step arranged to output first image data, a predetermined number of second image data and/or meta data relating to this first image data; and
a data transmission step arranged to transmit a transport stream;
wherein said transport stream includes the packets obtained by packetizing a first elementary stream including first image data, and a predetermined number of second elementary streams including said predetermined number of second image data and/or meta data respectively;
wherein said data transmission step inserts stream association information for associating said first elementary stream with said predetermined number of second elementary streams into said transport stream;
wherein said data transmission step inserts M pieces (M is an integer of two or more) said stream association information into said transport stream; and
wherein said M pieces of stream association information associate said first elementary stream with said second elementary stream within each set obtained by dividing said predetermined number of second elementary streams into M sets.

17. An image data transmission device comprising:
at least a data transmission unit configured to transmit a first transport stream and a second transport stream in a time-sharing manner;
wherein said first transport stream includes the packets obtained by packetizing a first elementary stream including first image data, and a predetermined number of second elementary streams including a predetermined number of second image data and/or meta data associated with said first image data respectively, and further includes M pieces (M is an integer of two or more) stream association information for associating said first elementary stream with said predetermined number of second elementary streams, wherein said M pieces of stream association information associate said first elementary stream with said second elementary stream within each set obtained by dividing said predetermined number of second elementary streams into M sets; and
wherein said second transport stream includes a packet obtained by packetizing a third elementary stream including third image data.

18. An image data reception device comprising:
at least a data reception unit configured to receive a first transport stream and a second transport stream in a time-sharing manner; and
a data obtaining unit configured to obtain data from said first transport stream and said second transport stream received at said data reception unit;
wherein said first transport stream includes the packets obtained by packetizing a first elementary stream including first image data, and a predetermined number of second elementary streams including a predetermined number of second image data and/or meta data associated with said first image data respectively, and further includes stream association information for associating said first elementary stream with said predetermined number of second elementary streams; and
wherein said second transport stream includes a packet obtained by packetizing a third elementary stream including third image data; and
wherein said data obtaining unit obtains, when receiving said first transport stream at said data reception unit, said first image data from this first transport stream, and further obtains, based on said stream association information, said predetermined number of second image data and/or meta data from said first transport stream, and obtains, when receiving said second transport stream at said image data reception unit, said third image data from this second transport stream.

19. The image data reception device according to claim 18, further comprising:
a superimposed information data output unit configured to output the data of superimposed information; and
a data superimposing unit configured to superimpose the data of superimposed information output from said superimposed information data output unit on image data obtained at said image data obtaining unit;
wherein said first image data obtained at said data obtaining unit after said first transport stream is received at said data reception unit is the image data of a base view making up stereoscopic image data; and
wherein said predetermined number of second imaged data obtained at said data obtaining unit after said first transport stream is received at said data reception unit is the image data of a predetermined number of views other than said base view making up said stereoscopic image data; and wherein said third image data obtained at said data obtaining unit after said first transport stream is received at said data reception unit is two-dimensional image data; and
wherein said data superimposing unit adjusts, when receiving said first transport stream at said data reception unit, the superimposed position of the data of said superimposed information output from said superimposed information data output unit based on disparity information between an image according to said first image data and an image according to said predetermined number of second image data obtained at said data obtaining unit, superimposes the data of superimposed information of which this superimposed position has been adjusted on said first image data and said predetermined number of second image data, and superimposes, when receiving said second transport stream at said data reception unit, the data of said superimposed information output from said superimposed information data output unit on said third image data obtained at said data obtaining unit without change.

20. An image data reception device comprising:
a data reception unit configured to receive a transport stream including the packets obtained by packetizing a first elementary stream including first image data, and a predetermined number of second elementary streams including a predetermined number of second image data and/or meta data relating to said first image data, and further including M pieces (M is an integer of two or more) stream association information for associating said first elementary stream with said predetermined number of second elementary streams, wherein said M pieces of stream association information associate said first elementary stream with said second elementary stream within each set obtained by dividing said predetermined number of second elementary streams into M sets; and
a data obtaining unit configured to obtain said first image data from said transport stream received at said data reception unit, and further to obtain said predetermined number of second image data and/or meta data from said first transport stream based on said stream association information.

21. The image data reception device according to claim 20, further comprising:
a resolution adjustment unit configured to adjust the output resolutions of said first image data and said second image data obtained at said data obtaining unit.

22. The image data reception device according to claim 21, wherein said stream association information further includes the control information of the output resolutions of said first image data and said second image data; and
wherein said resolution adjustment unit adjusts the output resolutions of said first image data and said second image data based on the control information of said output resolutions included in said stream association information, and displays by taking output synchronization.

23. The image data reception device according to claim 20, further comprising, with said meta data obtained at said data obtaining unit being disparity information corresponding to said stereoscopic image data:
a post-processing unit configured to subject said first image data and said second image data obtained at said data obtaining unit to interpolation processing using this disparity information to obtain the display image data of a predetermined number of views.

* * * * *